(12) United States Patent
Knag et al.

(10) Patent No.: US 11,783,160 B2
(45) Date of Patent: Oct. 10, 2023

(54) MEMORYLESS WEIGHT STORAGE HARDWARE FOR NEURAL NETWORKS

(71) Applicant: Intel Corporation, Santa Clara, CA (US)

(72) Inventors: Phil Knag, Portland, OR (US); Gregory Kengho Chen, Portland, OR (US); Raghavan Kumar, Hillsboro, OR (US); Huseyin Ekin Sumbul, Portland, OR (US); Ram Kumar Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1656 days.

(21) Appl. No.: 15/884,001

(22) Filed: Jan. 30, 2018

(65) Prior Publication Data

US 2019/0042913 A1   Feb. 7, 2019

(51) Int. Cl.
*G06N 3/04* (2023.01)
*G06N 3/063* (2023.01)
*G06N 3/08* (2023.01)
*G06N 3/044* (2023.01)
*G06F 7/58* (2006.01)

(52) U.S. Cl.
CPC ............ *G06N 3/04* (2013.01); *G06N 3/044* (2023.01); *G06N 3/063* (2013.01); *G06N 3/08* (2013.01); *G06F 7/582* (2013.01); *G06F 7/588* (2013.01)

(58) Field of Classification Search
CPC ........ G06N 3/04; G06N 3/0445; G06N 3/063; G06N 3/08; G06F 7/582; G06F 7/588
See application file for complete search history.

(56) References Cited

U.S. PATENT DOCUMENTS

| 10,514,694 | B1 * | 12/2019 | Mundhenk | G06N 20/10 |
| 10,891,156 | B1 * | 1/2021 | Zhao | G06F 9/4881 |
| 10,891,536 | B1 * | 1/2021 | Merkel | G06N 3/0445 |
| 11,250,319 | B1 * | 2/2022 | Huang | G06N 3/0481 |

(Continued)

OTHER PUBLICATIONS

Cai et al., "Hardware Acceleration of Bayesian Neural Networks using RAM based Linear Feedback Gaussian Random Number Generators", 2017, 2017 IEEE 35th International Conference on Computer Design, pp. 289-296. (Year: 2017).*

(Continued)

*Primary Examiner* — Ying Yu Chen
(74) *Attorney, Agent, or Firm* — HANLEY, FLIGHT & ZIMMERMAN, LLC

(57) ABSTRACT

Various systems, devices, and methods for operating on a data sequence. A system includes a set of circuits that form an input layer to receive a data sequence; first hardware computing units to transform the data sequence, the first hardware computing units connected using a set of randomly selected weights, a first hardware computing unit to: receive an input from a second hardware computing unit, determine a weight of a connection between the first and second hardware computing units using an identifier of the second hardware computing unit and a fixed random weight generator, and operate on the input using the weight to determine a state of the first hardware computing unit; and second hardware computing units to operate on states of the first computing units to generate an output based on the data sequence.

25 Claims, 20 Drawing Sheets

(56) References Cited

U.S. PATENT DOCUMENTS

| | | | | |
|---|---|---|---|---|
| 2015/0039546 | A1* | 2/2015 | Alvarez-Icaza | G06N 3/0472 706/27 |
| 2016/0098629 | A1* | 4/2016 | Lipasti | G06N 3/08 706/26 |
| 2019/0026430 | A1* | 1/2019 | Grouchy | G06N 20/00 |

OTHER PUBLICATIONS

Chen et al., "Compressing Neural Networks with the Hashing Trick", 2015, Proceedings of the 32 nd International Conference on Machine Learning, Lille, France, 2015. JMLR: W&CP vol. 37, pp. 1-10. (Year: 2015).*

Adhikari et al., "A Circuit-Based Learning Architecture for Multilayer Neural Networks With Memristor Bridge Synapses", Jan. 6, 2015, IEEE Transactions on Circuits and Systems-I: Regular Papers, vol. 62, No. 1, Jan. 2015, pp. 215-223. (Year: 2015).*

Alomar et al., "FPGA-Based Stochastic Echo State Networks for Time-Series Forecasting", 2016, Computational Intelligence and Neuroscience vol. 2016, pp. 1-14. (Year: 2016).*

Saadat et al., "Training Echo Estate Neural Network Using Harmony Search Algorithm", 2017, International Journal of Artificial Intelligence, vol. 15, No. 1, pp. 1-18. (Year: 2017).*

* cited by examiner

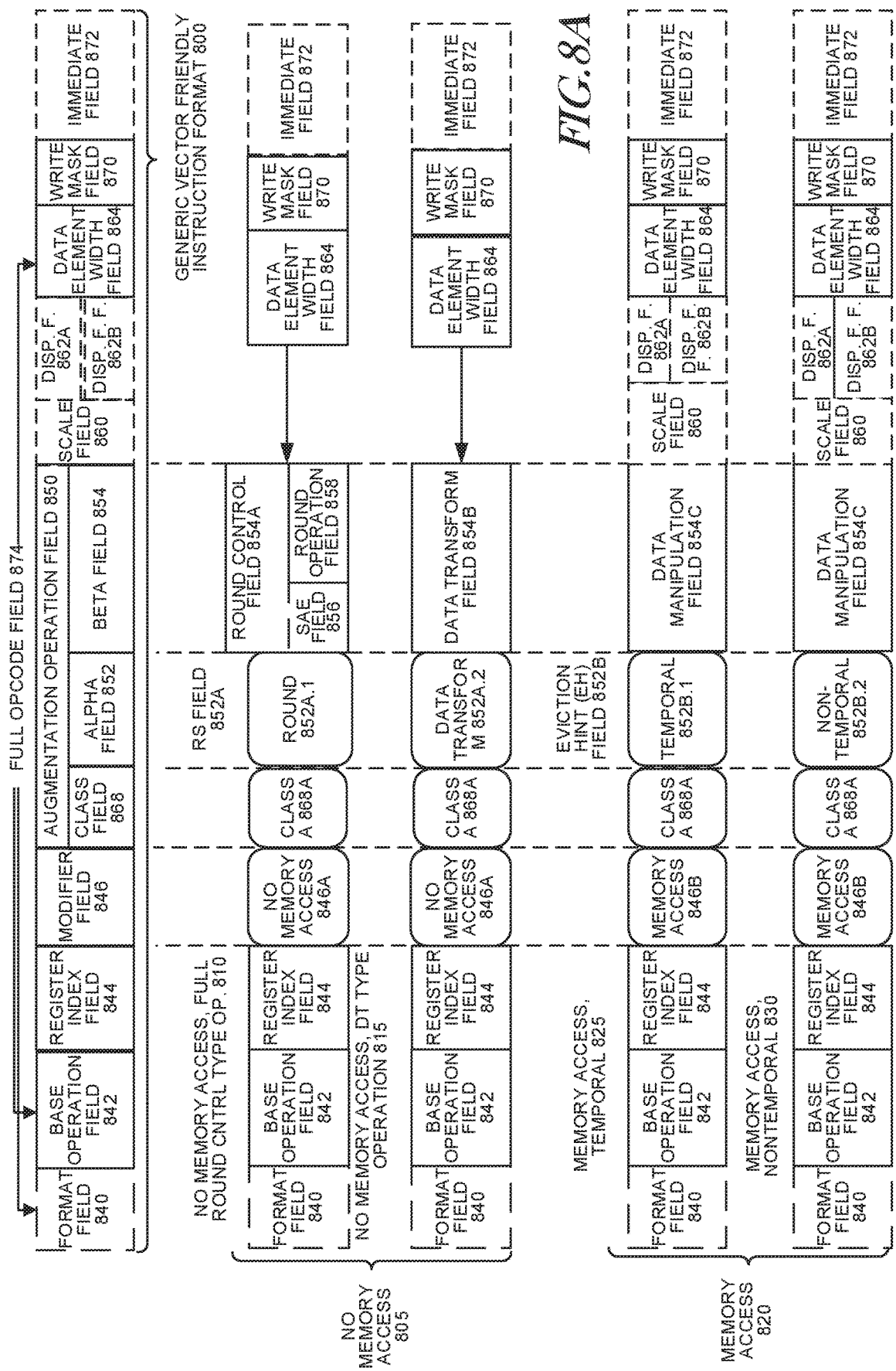

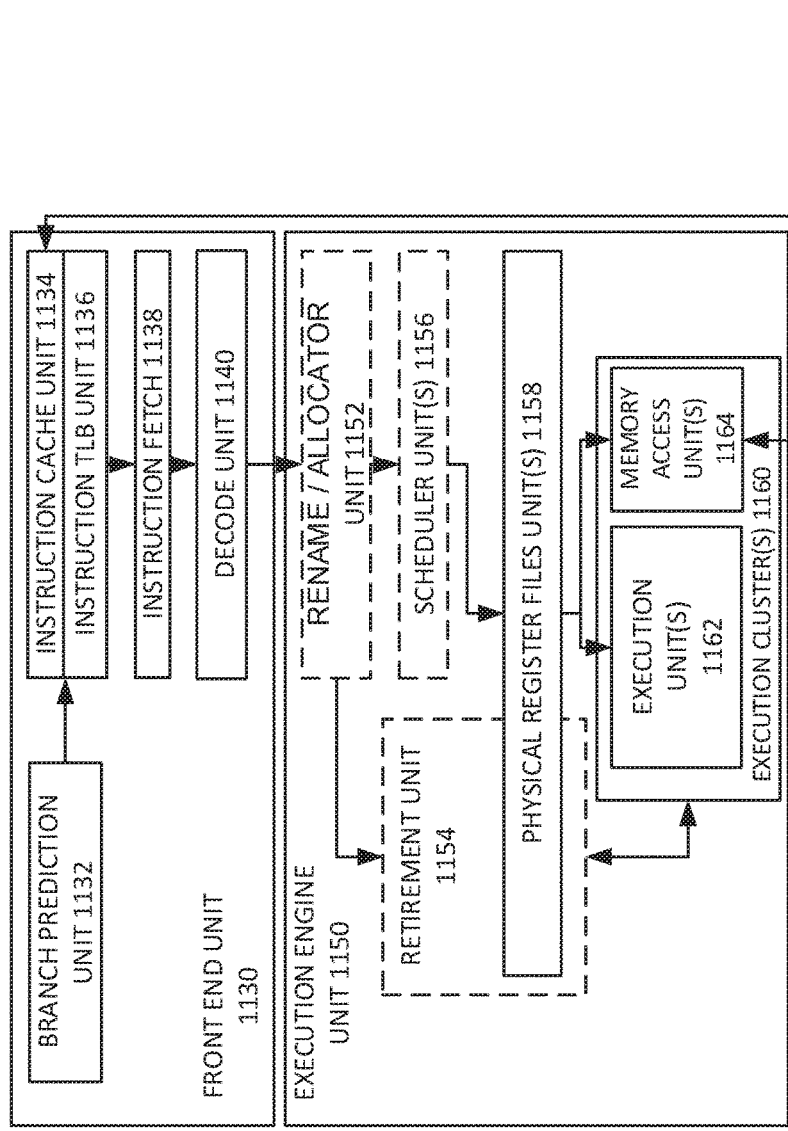
FIG. 11A
FIG. 11B

MEMORYLESS WEIGHT STORAGE HARDWARE FOR NEURAL NETWORKS

TECHNICAL FIELD

Embodiments described herein generally relate to computer hardware and in particular, to synaptic weight storage in neural networks.

BACKGROUND

Neuromorphic processors may include integrated circuits having digital and analog hardware elements configured to implement artificial neural network based computing systems. These hardware elements may include computing units that are logically, or physically, connected using a set of weighted connections to form artificial neural networks. These artificial networks may be trained using machine learning techniques to solve problems including, for example, classification, filtering, image recognition, and speech processing.

The computing, or problem, solving potential of an artificial neural network implemented using a neuromorphic processor may be at least partially determined by the quantity of computing units available in the neuromorphic processor. Such computing, or problem, solving potential may also be at least partially determined by the number of weighted connections between the computing units. Consequently, physical constraints on the number of, and on the connectivity between, the computing units within a neuromorphic processor may also act as constraints on the performance of artificial neural networks implemented using these devices. Such constraints may include constraints on device area, communication bandwidth between elements of the neuromorphic processor, and communication latency.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 8A-8B are block diagrams illustrating a generic vector friendly instruction format and instruction templates thereof according to an embodiment;

FIG. 11A is a block diagram illustrating both an in-order pipeline and a register renaming, out-of-order issue/execution pipeline according to an embodiment;

FIG. 11B is a block diagram illustrating both an in-order architecture core and a register renaming, out-of-order issue/execution architecture core to be included in a processor according to an embodiment;

DETAILED DESCRIPTION

Figure 1:
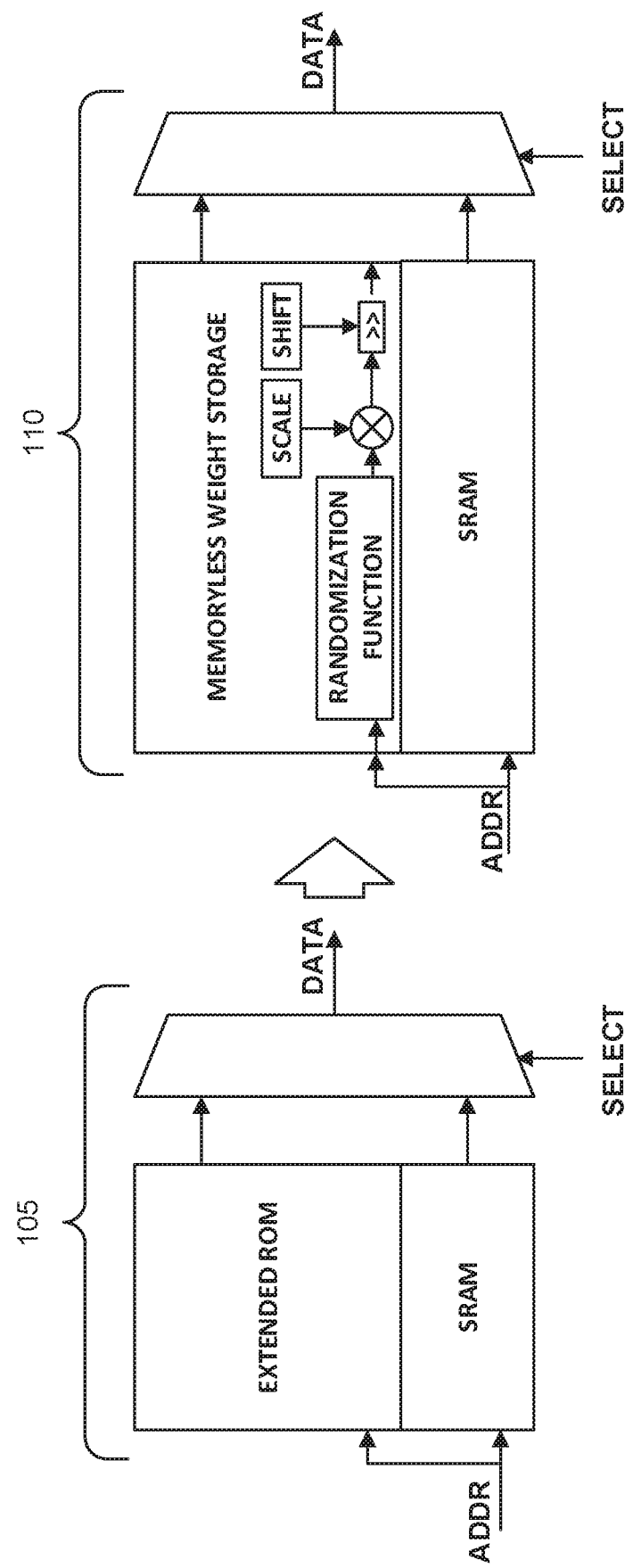
FIG. 1 is a block diagram illustrating adapting a read only memory based synaptic weight storage device of a neuromorphic processor to a memoryless synaptic weight storage device, according to various embodiments.

In the following description, for purposes of explanation, numerous specific details are set forth in order to provide a thorough understanding of some example embodiments. It will be evident, however, to one skilled in the art that the present disclosure may be practiced without these specific details.

Physical memory used to store synaptic connection weights (hereinafter, "synaptic weights") may be a limiting constraint to the size and performance of artificial neural networks implemented using neuromorphic processors or other hardware accelerators (hereinafter, "neuromorphic processor" or "neuromorphic processors"). In a fully connected artificial neural network (ANN), for example, the amount of memory used to store synaptic weights may increase quadratically with the number of computing units (e.g., artificial neurons) used to implement the network. The quadratic growth in memory resources needed as a result of increases in the size of an ANN may limit the size of the ANN by, for example, reducing the amount of area available on a chip, or other integrated circuit, to construct computing units. For example, more than 50% of the chip area of a neuromorphic processor integrated circuit used to implement some ANNs may be used to store synaptic weights. The quadratic growth in used memory resources in response to the size of an ANN may the limit performance of the ANNs by increasing on-chip power consumption, data access latency, and communication bandwidth requirements.

Certain synaptic weight memory reduction techniques try to mitigate the size and performance limitations attributable to synaptic weight storage by reducing synaptic weight memory overhead (e.g., the amount of synaptic weight information stored by a system). Such techniques may include using reduced precision synaptic weights, compressing synaptic weight data before storage, or reducing the connectivity of ANNs (e.g., implementing ANNs having sparse connectivity). Such synaptic weight memory reduction techniques may reduce chip area used for synaptic weight storage. Such synaptic weight memory reduction techniques may also reduce energy consumption and communication costs by, for example, avoiding off-chip communication to synaptic weight storage provided by separate integrated circuits.

Embodiments of the present disclosure are based on the recognition that randomization functions that produce deterministic random numbers in response to, for example, address inputs may be used to augment or replace ANN synaptic weights stored in device memories (e.g., random access memories or register files associated with computing units in a neuromorphic processor). Such randomization functions may include pseudorandom number generators and hash functions. The deterministic random numbers generated by a randomization function may be scaled (e.g., mathematically, or logically, adjusted) to generate fixed (e.g., constant) random synaptic weights that correspond to fixed random synaptic weights used by some ANNs.

The synaptic weight generation techniques of the present disclosure may provide an interface that is substantially similar to an interface used to access, for example, a read only memory (ROM). For example, a specific location in a sequence of deterministic random numbers generated by a randomization function may correspond to an address location in ROM. Additionally, a pseudorandom number generated at the specific location in the sequence may correspond to a value (e.g., a synaptic weight) stored at the corresponding ROM address location. Randomization functions, as discussed herein, may therefore be used as memoryless random weight storage to replace read only memories.

Embodiments of the present disclosure include techniques (e.g., devices, systems, and methods) for mitigating synaptic weight memory limitations for ANNs, or other systems, that use fixed random weights. Such techniques include replacing memory allocated for these fixed random weights with a randomization function, such as a pseudorandom number generator (PRNG) or a hash function. Examples of ANNs that may benefit from these techniques include reservoir computing networks, such as Liquid State Machines and Echo State Networks. A reservoir computing network may include computing units, or artificial neurons implemented using computing units, interconnected to form an input layer that receives inputs to the network, a recurrent layer (e.g., a reservoir) that generates and preserves non-linear transformations of the inputs, and a trainable output layer. Computing units in the recurrent layer may be generally connected using fixed random weights. Replacing the storage for these fixed random weights using the techniques of the present disclosure may improve the performance of reservoir computing networks implemented using neuromorphic processors. Such improvements may result from reducing memory area overhead. Such reductions in memory area overhead may free memory resources, which may be used to store computing unit, or artificial neuron, state information. Such freed memory resources may also be used to store synaptic weights that may be learned though training an ANN. Additionally, such freed memory resources may enable an ANN to be fully mapped on a single chip, thus removing the need for off chip memory access, eliminating a common energy and performance bottleneck. Both of these benefits may enable the implementation of larger, and more connected. ANNs.

The systems, methods, and devices described herein may be implemented using neuromorphic processors or other hardware accelerator devices. Such neuromorphic processors may be configured to implement one or more ANN models. Such ANN models may include a reservoir computing network. At least a portion of neuromorphic processor memory allocated to store a set (e.g., one or more) of fixed random synaptic weights used by, for example, a recurrent layer of an ANN may be replaced by a randomization function, as described herein. The randomization function may be disposed adjacent to a synaptic weight memory bank or array (e.g., memory allocated to store adjustable synaptic weights) of the neuromorphic processor. Such a randomization function may be used as an extended read only memory partition of the neuromorphic processor memory. When a memory address in this read only partition is accessed, control logic may switch the output of the neuromorphic processor memory from the synaptic weight memory bank to the randomization function. In some embodiments, the output of the randomization function may be scaled to generate synaptic weights that satisfy the echo-state property, as described herein.

The term random number or random numbers, as used herein, refers to pseudorandom numbers, or numbers that appear random within a specified mathematical definition or threshold.

Turning now to the figures, FIG. 1 is a block diagram illustrating adapting a read only memory based synaptic weight storage device 105 of a neuromorphic processor to a memoryless synaptic weight storage device 110, according to various embodiments. As shown in FIG. 1, the technique may include replacing an extended ROM area of the synaptic weight storage device 105 with a memoryless synaptic weight storage element. The memoryless synaptic weight storage element may operate as a ROM by using a randomization function to generate sets of fixed random numbers, as described herein. Such fixed random numbers may be converted to fixed random synaptic weights using, for example, one or more scaling circuits.

Figure 2:
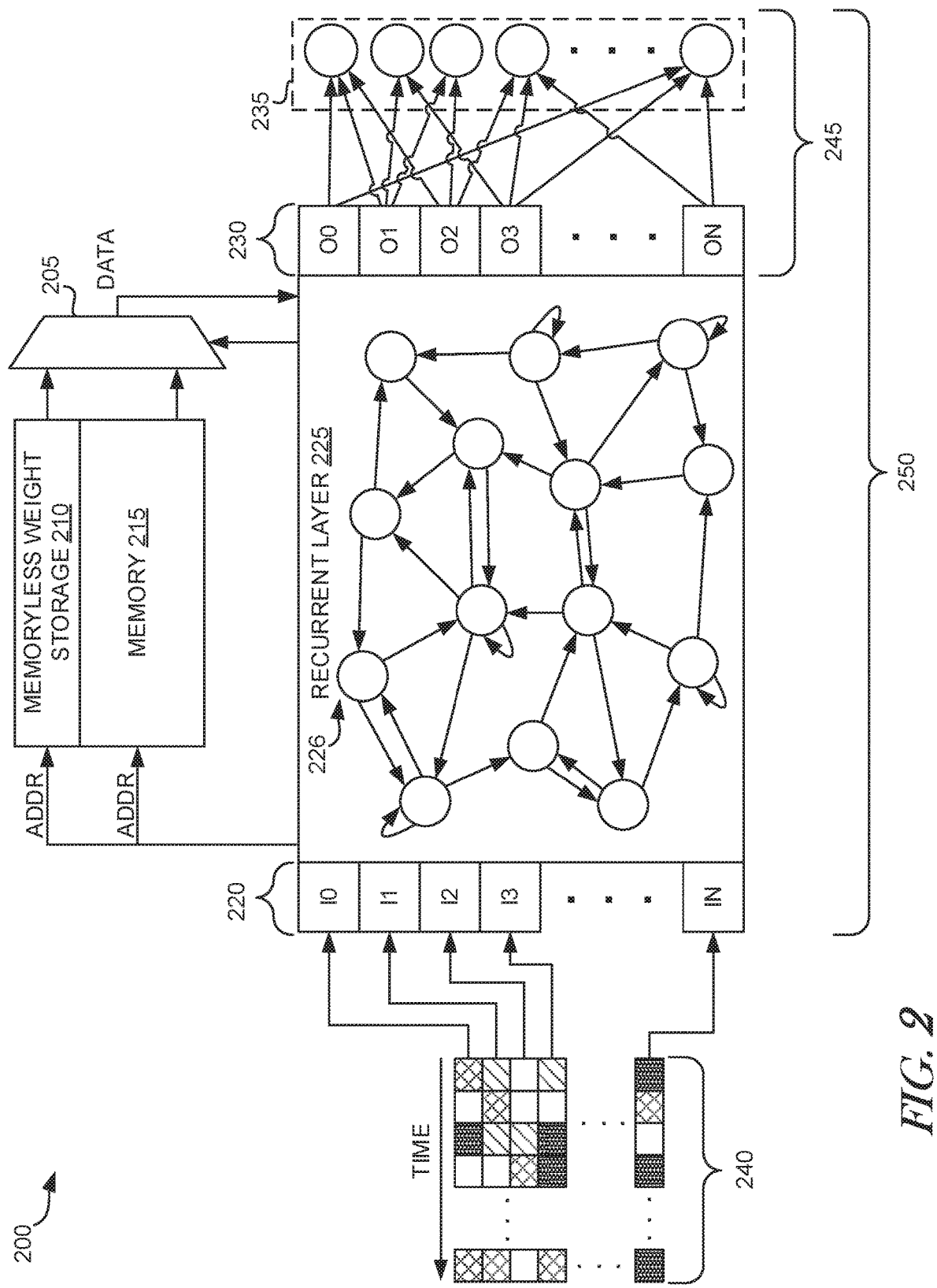
FIG. 2 is a block diagram of a neuromorphic processor configured with memoryless weight storage, according to various embodiments.
Figure 7:
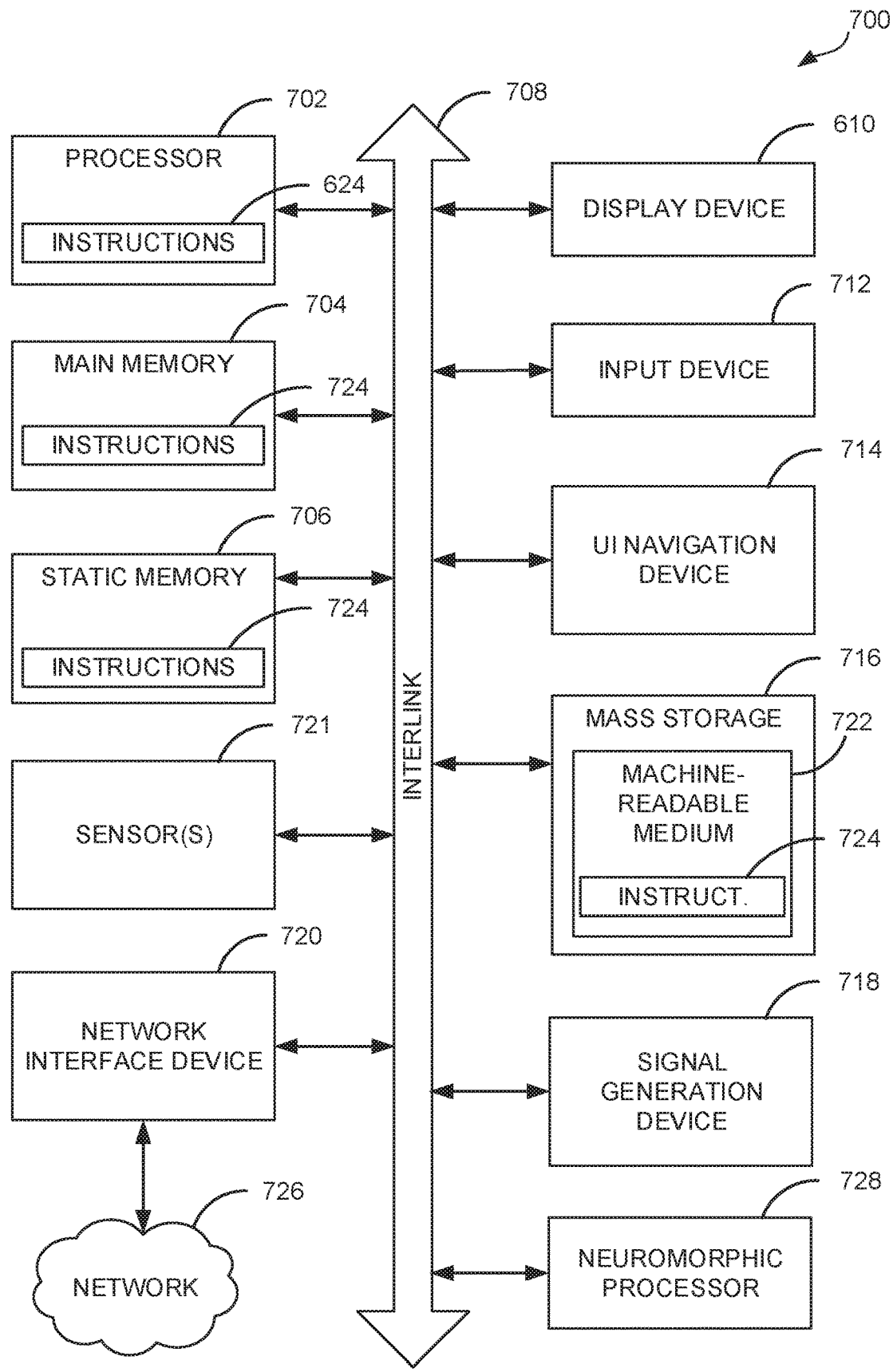
FIG. 7 is a block diagram illustrating an example of machine upon which any one or more of the techniques (e.g., methodologies) discussed herein may perform, according to various embodiments.

FIG. 2 is a block diagram of a neuromorphic processor 200 configured with memoryless weight storage 210, according to various embodiments. The neuromorphic processor 200 may include a multiplexer 205, the memoryless weight storage 210, a memory 215, and one or more computing units 250 (hereinafter, computing unit). Such a neuromorphic processor 200 may be implement as an integrated circuit. Such a neuromorphic processor 200 may also be implemented as two or more integrated circuits. Such integrated circuits may include an integrated circuit having the computing unit 250, as well as one or more integrated circuits having the multiplexer 205, the memoryless weight storage 210, and the memory 215. In some embodiments, the neuromorphic processor 200 may be a component (e.g., a hardware accelerator, a co-processor, or other device) of a computing system, such as the computing system 700 (FIG. 7). In these embodiments, the computing system 700 may be configured to provide an input data sequence 240 to the computing unit 250. Such input data sequence 240 may include a data sequence where elements are correlated in time, or have a time dependent relationship, such as a time series. In some embodiments, the neuromorphic processor 200 may be implemented as a processor 1300 (FIG. 13), a processor 1410 (FIG. 14), or a coprocessor 1445 (FIG. 14).

The memoryless weight storage 210 may include one or more randomization functions selected to replace memory arrays for storing fixed random synaptic weights. In some embodiments, the memoryless weight storage 210 may generate a mapping between an address input and a random number output of the randomization functions. Such a mapping may reduce the amount of memory used for, or allocated to, synaptic weight storage in the neuromorphic processor 200. Such reductions in memory may improve energy efficiency by enabling the replaced memory arrays to be powered down during operation of a neuromorphic processor. Such reductions in memory may also reduce the costs of neuromorphic processors by enabling the replaced, or unused, memory arrays to be removed from the design of these integrated circuits, reducing chip size. In certain embodiments, such reductions in memory may enable an ANN to be fully mapped on a single chip, thus removing the need for off chip memory access, eliminating a common energy and performance bottleneck.

The term memoryless, as associated with the memoryless weight storage 210, refers to the fact that the fixed random synaptic weights generated, or produced, by the memoryless weight storage 210 are generated rather than stored in specific memory devices. Such generating may include executing one or more logical or mathematical operations, or actuating one or more electrical circuits to transform an address input into a fixed random synaptic weight. Such transforming may include mapping an address input to a random number output of a randomization function, as described herein. The term memoryless does not mean that the memoryless weight storage 210 does not have any memory, or does not use memory, or is not stored in memory device (e.g., in ROM). Certain components of the memoryless weight storage 200 (e.g., initializing values or seeds, coefficients, and elements of logical and mathematical operations) may be stored one or more memory device.

In some embodiments, the memoryless weight storage 210 may be disposed adjacent to memory 215 in the neuromorphic processor 200. The memory 215 may be a modifiable random access memory or register file allocated to store, inter alia, synaptic weights that may be learned or adjusted using a machine learning technique. In some embodiments, the memoryless weight storage 210 may be operated as a ROM extension to the memory 215, as described herein. For example, both the memoryless weight storage 210 and the memory 215 may receive an address input from the computing unit 250 to access a stored synaptic weight. When the received memory address references a location associated with the memoryless weight storage 210, control logic in the neuromorphic processor 200 may switch the output of the multiplexer 205 from the memory 215 to the memoryless weight storage 210.

The computing unit 250 may include one or more electronic circuits configured with internal memory (e.g., register files and latches), processing logic, and other electronic circuits, to implement one or more artificial neurons. Such implementation may include emulating the operation of, or functioning as, one or more artificial neurons. The internal memory may store the state of an artificial neuron (e.g., an activation potential of the artificial neuron). The internal memory may also store an identifier of the artificial neuron, as well as the identifiers of other connected artificial neurons. The computing unit 250 may also include electronic circuitry, or other elements, to enable artificial neurons to exchange information (e.g., activation potentials and identifiers). Such electronic circuitry, or elements, may also enable the neuromorphic processor 200 to synchronize processing in individual artificial neurons of an ANN.

The neuromorphic processor 200 may be configured to implement an ANN, such as a reservoir computing network. The reservoir computing network may include an input layer 220, a recurrent layer 225, and an output layer 245. Such a reservoir computing network may be an implementation of a recurrent neural network, configured such that a recurrent portion of the network (e.g., recurrent layer 225) is logically, or physically, separate from non-recurrent portions of the network (e.g., input layer 220 and output layer 245). Such recurrent networks may be particularly useful for processing temporal data (e.g., input data sequence 240) by, for example, preserving a non-linear transformation of the inputs to the network in the internal states of the network.

The input layer 220 may include an input buffer I0-IN. The input buffer I0-In may include one or more storage elements, such as static random access memory, register files, or latches. The one or more storage elements may temporarily store input data (e.g., a portion of the input data sequence 240) received by the ANN. In some embodiments, the input layer 220 may also include processing components, such as computing units or other circuits configured to implement one or more input artificial neurons (hereinafter, input neurons). The processing components may perform initial processing on the input data before the data is received, or operated on, by other layers of the ANN. Such initial processing may include scaling, thresholding, or other data conditioning operations.

The recurrent layer 225 may include one or more computing units 250 configured to implement one or more recurrent layer artificial neurons 226 (hereinafter, recurrent neuron). Each recurrent neuron 226 may be randomly logically, or physically, connected to itself or to one or more other recurrent neurons to form the recurrent layer 225. One or more recurrent neurons 226 may also be randomly connected to the input layer 220 to receive input data sequence 240. The strength of a connection to a recurrent neuron 226 (e.g., the strength of a connection terminating at a recurrent neuron) may be indicated by a fixed synaptic weight having a randomly selected value. In some embodiments, the recurrent layer 225 may be a layer of randomly connected recurrent neurons 226 having fixed random synaptic weights, such as reservoir layer in a reservoir computing network.

In some embodiments, state information and fixed random synaptic weights associated with a recurrent neuron 226 may be stored in the memory 215. Additionally, fixed random synaptic weights associated with a recurrent neuron 226 may be stored in the memoryless weight storage 210, as described herein.

The output layer 245 may include one or more output artificial neurons 235 (hereinafter, output neurons). Such output neurons 235 may be implemented using one or more computing units 250. Such output neurons 235 may be logically, or physically, connected to one or more recurrent neuron 226. In some embodiments, connections between the output neurons 235 and the recurrent neurons 226 may be randomly selected. The synaptic weights of such connections may be learned (e.g., adjust, or adapted using, for example, a supervised learning technique) to cause the output layer 245 to generate an output that corresponds to a certain property of, or a certain relationship between elements in, the input data sequence 240.

In some embodiments, the output layer 245 may include output buffers 230 (e.g., storage elements 00-OM) to temporarily store outputs (e.g., state information or activation potentials) of the recurrent neurons 226.

Figure 3:
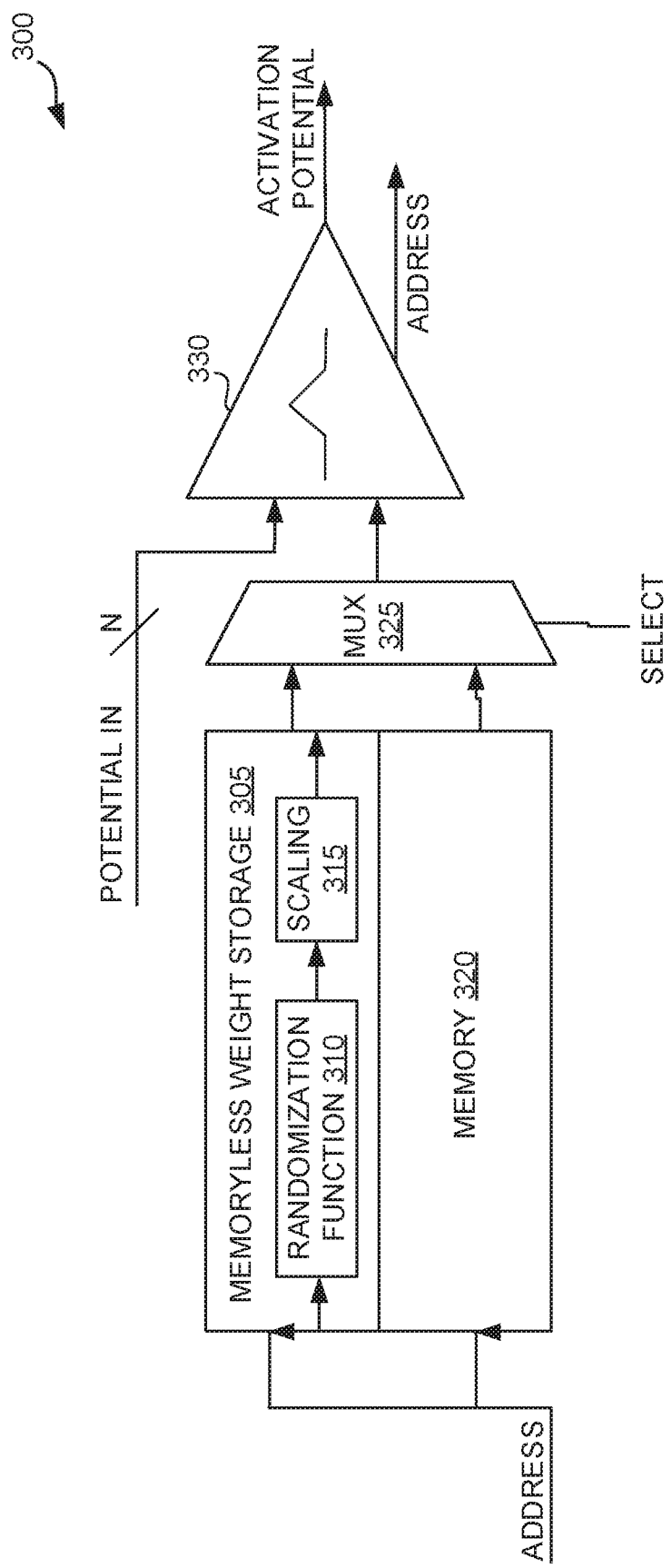
FIG. 3 is a block diagram of a computing unit of neuromorphic processor configured with memoryless weight storage, according to various embodiments.

FIG. 3 is a block diagram of a computing unit 300 of neuromorphic processor configured with memoryless weight storage, according to various embodiments. The computing unit 300 may include memoryless weight storage 305, memory 320, multiplexer 325, and processing component 330. The computing unit 300 may be an example of one of the computing units 250 (FIG. 2). The memory 320 and the multiplexer 325 may be examples of the memory 215 (FIG. 2) and the multiplexer 205 (FIG. 2), respectively. In some embodiments, one or more components of the computing unit 300 may be shared with other computing units of the neuromorphic processor. For example, the memoryless weight storage 305, the memory 320, and the multiplexer 325 may be shared by two or more computing units. The computing unit 300 may be useful for implementing one or more artificial neurons in an ANN, as described herein.

The memoryless weight storage 305 may include a randomization function 310 (e.g., a fixed random number generator) and a scaling unit 315. The randomization function 310 may be a logical, mathematical, or physical object that generates a set of deterministic random numbers for a given input (e.g., an input address). Such an object may include one or more electronic circuit configured to implement a logical, or mathematical algorithm, for generating a set of deterministic random numbers. Such an object may also be a table, or a sequence of computer executable code, for generating a set of deterministic random numbers. Examples of randomization functions may include pseudorandom number generators and hash functions.

Numbers generated by the randomization function 310 may be statistically random in consideration of the fact that, for a given instantiation of the randomization function (e.g., for a given set of randomly selected initializing or generating parameters of the randomization function), the sequence of numbers generated by the randomization function may not be reasonably be determined with a statistical accuracy greater than the equivalent of guessing. Such statistical randomness may also be predicated on there not being any recognizable patterns or regularities in the sequence of numbers generated by the randomization function 310. While the numbers generated by the randomization function 310 may have some random properties, embodiments of the present disclosure do not require any particular threshold level or amount of statistical randomness. In some embodiments, for example, the numbers generated by the randomization function 310 may be completely random, while in certain embodiments the numbers produced by the randomization function may be predictable.

Numbers generated by the randomization function 310 may be deterministic in the sense that for a given instantiation of the randomization function, each time a particular input is received, the randomization function may generate the same output (e.g., the same pseudorandom number). In some embodiments, the particular input may include an input value as well as the particular order or sequence in which the input value is received at the randomization function 310, as described herein.

Scaling unit 315 may include one or more electronic circuits to scale the random numbers generated by the randomization function 310. Such scaling may enable the memoryless weight storage 305 to generate synaptic weights for a recurrent layer of an ANN that have the echo-state property (e.g., a mathematical property). In some embodiments, a recurrent layer (e.g., a reservoir) implemented using fixed random synaptic weights may have the echo-state property for arbitrary inputs to the layer when the spectral radius of the recurrent layer weight matrix is smaller than unity (e.g., the spectral radius of a weight matrix generated using the synaptic weights of the recurrent layer is less than 1). In certain embodiments, the scaling unit 315 may scale the random numbers generated by the randomization function 310 using a fixed point multiplier circuit and a shifter circuit, as shown in FIGS. 4A and 5A.

The processing unit 330 may include one or more electronic circuits to execute processing functions of one or more artificial neurons. Such electronic circuits may include arithmetic logic units, storage elements, and control circuits. Such processing functions may include receiving activation signals from one or more connected artificial neurons, querying the memoryless weight storage 305 or the memory 320 to determine synaptic weights of connections between the one or more connected artificial neurons, and calculating an updated state using this information. Such processing functions may also include transmitting the updated state to other artificial neurons. Such processing functions may additionally include transmitting an identifier, or an address, of the artificial neuron to other artificial neurons.

Figures 4A, 4B:
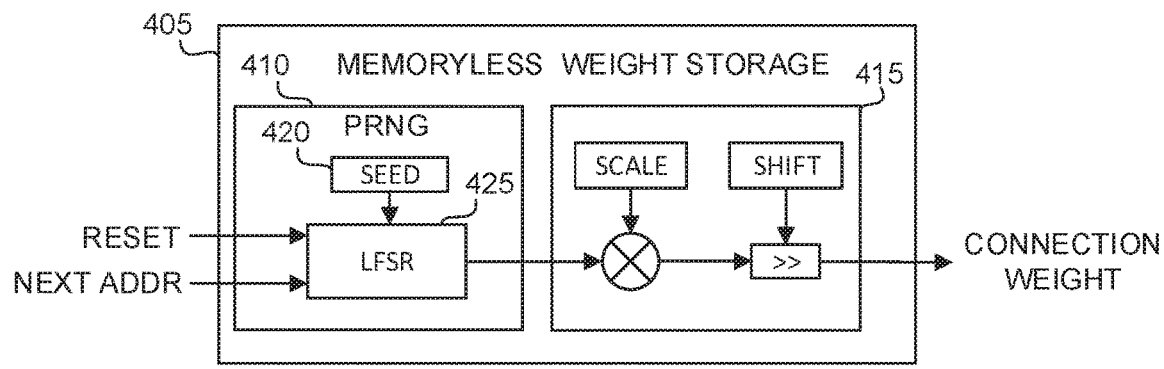
FIG. 4A is a block diagram of an example of a linear feedback shift register based memoryless weight storage, according to various embodiments.
FIG. 4B is a waveform diagram illustrating aspects of the operation of linear feedback shift register based memoryless weight storage, according to various embodiments.
Figures 5A, 5B:
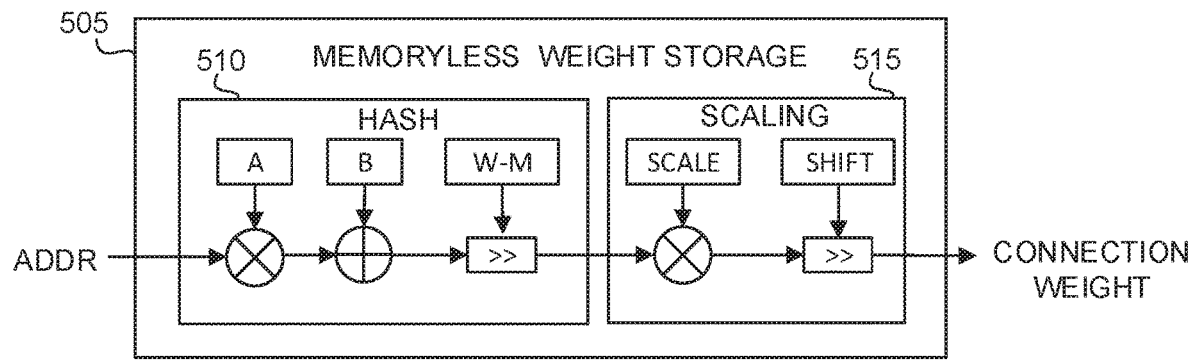
FIG. 5A is a block diagram of an example of a hash function-based memoryless weight storage, according to various embodiments.
FIG. 5B is a waveform diagram illustrating aspects of the operation of an example of a hash function-based memoryless weight storage, according to various embodiments.

FIG. 4A is a block diagram of an example of a linear feedback shift register based memoryless weight storage 405, according to various embodiments. Such memoryless weight storage may be an example of the memoryless weight storage 305 (FIG. 3). The memoryless weight storage 405 may include a randomization function 410 and a scaling unit 415.

The randomization function 410 may include one or more circuits configured to implement a pseudorandom number generator. The one or more circuits may implement one or more known pseudorandom number generation techniques or algorithms. For example, the one or more circuits may implement the pseudorandom number generator (PRNG) as a linear feedback shift register (LFSR) 425. An LFSR-based randomization function may be initialized by resetting the LFSR 425 and initializing it to a known state using a seed 420. In some embodiments, the seed 420 may be randomly selected.

The LFSR-based randomization function generally provides the next random value in a sequence of random values that may be generated by the randomization function. The random numbers generated by an LFSR-based randomization function may be deterministic when viewed, or interpreted, sequentially for a given initialization of the randomization function (e.g., for a given initialing seed). An LFSR-based randomization function may therefore operate as a memoryless synaptic weight storage that only permits sequential access, such as a first-in, first-out (FIFO) queue. Such sequential access restrictions may cause computing units, or artificial neurons, that share the memoryless weight storage 405 to access the storage a prescribed order or sequence, as shown in FIG. 4B.

The scaling unit 415 may be an example of the scaling unit 315 (FIG. 3). Such a scaling unit may include a multiplier circuit (e.g., a fixed point multiplier) and a shifting circuit to operate on outputs of the randomization function 410 to generate connections weights that satisfy the echo-state property. The multiplier circuit and the shifter circuit are one example of electronic circuits that may be used to scale the random numbers produced by randomization function 410. Other circuits implementing different mathematical or logical operations may be used to scale random number outputs of the randomization function 410 to satisfy the echo-state property.

FIG. 4B is a waveform diagram illustrating aspects of the operation of linear feedback shift register based memoryless weight storage, according to various embodiments. In some embodiments, each computing unit in a neuromorphic processor may implement a single artificial neuron in a recurrent layer of the ANN. Each of these artificial neurons may be associated with an LFSR-based memoryless weight storage. In these embodiments, the artificial neurons may use a broadcast based communication channel to transmit their activation energy to other computing units in the ANN. Access to the broadcast based communication channel may be divided into time steps. The waveforms in FIG. 4B illustrates that, due to the sequential access requirements of LFSR-based memoryless weight storage, artificial neurons in an ANN may be allocated predetermined time slots within each time step to broadcast information to the network. The sequence of predetermined time slots may be constant between time steps. As shown in FIG. 4B, artificial neurons may take turns broadcasting their activation potentials to the entire ANN in a specific sequence in each time step. For example, in the first communication time slot of the first time step, the LFSR associated with each artificial neuron may be seeded with a value corresponding to the artificial neuron's connection (e.g., the synaptic weight) to the artificial neuron having identifier, or address, zero. After each communication timeslot, each artificial neuron may increment their LFSRs to generate their connection to the next communicating artificial neuron. This communication sequence may be repeated for each time step.

In some embodiments, artificial neurons with synaptic weights stored in real memory locations (e.g., in the memory 320 of FIG. 3) may also access the real memory using previously described sequential access technique by initializing their memory address, or other internal index into the real memory, to zero during the first communication timeslot and incrementing the address after every timeslot. This communication sequence may also be repeated for each time step.

In an example ANN having a 1024 neuron recurrent layer implemented using computing units configured with LFSR-based memoryless weight storage, an LFSR-based memoryless weight storage constructed using a 32-bit LFSR resulted in 96% savings in chip area and 91% savings in energy compared to an equivalent implementation using a 1024×8 bit SRAM (e.g., the amount of storage used to store the synaptic weights of a single neuron of a 1024 artificial neuron recurrent layer).

When an example echo-state network containing 1024 artificial neurons is trained to reconstruct the Mackey Glass function using LFSR-based memoryless weight storage with 32-bits of state and 8-bits of output, the network achieved a root mean squared error (RMSE) of 1.01E-3. The performance of this example echo-state network is comparable to a simulated baseline network that uses 8-bit randomly generated synaptic weights which had a RMSE of 1.37E-3.

FIG. 5A is a block diagram of an example of a hash function-based memoryless weight storage 505, according to various embodiments. Such memoryless weight storage may be an example of the memoryless weight storage 305 (FIG. 3). The memoryless weight storage 505 may include a randomization function 510 and a scaling unit 515.

The randomization function 510 may include one or more electronic circuits configured to implement a hash function-based random number generator. For example, the one or more electronic circuits may implement a hash function-based on the following multiply-shift scheme described by Martin Dietzfelbinger et al in the 1997 publication titled A Reliable Randomized Algorithm for the Closest-Pair Problem:

$$h(x)=(\text{unsigned})\ (a*x+b)>>(w-M).$$

Given a selection of random positive integers a and b, and an input x having a w-bit word length, the hash function h(x) generates random M-bit numbers. These random numbers may hereinterpreted as signed fixed point numbers.

Hash function-based memoryless weight storage may have the advantage of being randomly addressable. Artificial neurons in ANN implemented using hash function-based memoryless weight storage may broadcast their activation potentials to the network through a global arbiter, or other control circuit, in any of a number of timeslots during a time step. In some embodiments, the global arbiter enables neurons to broadcast to a shared communication channel in a number of timeslots equal to the number of active artificial neurons in the ANN, as shown in FIG. 5B.

FIG. 5B is a waveform diagram illustrating aspects of the operation of an example of a hash function-based memoryless weight storage, according to various embodiments. The waveforms in FIG. 5B illustrate that, due to the random access structure of the hash function-based memoryless storage technique described herein, active artificial neurons in a ANN implemented using these techniques may update their connections to other artificial neurons in an arbitrary sequence during a given time step. More specifically, the waveforms in FIG. 5B illustrate two artificial neurons updating their connections in an arbitrary sequence (e.g., randomly) during two time steps.

Figure 6:
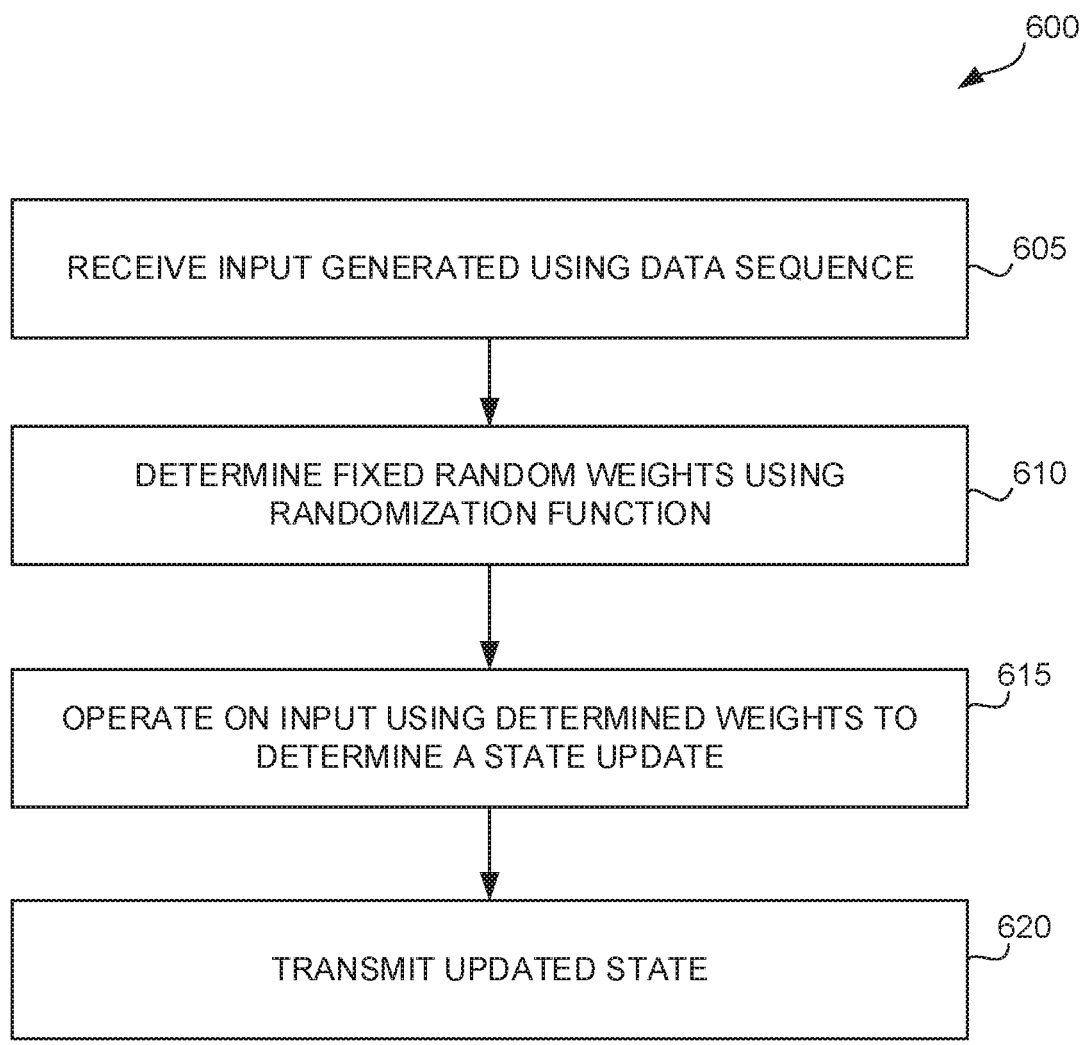
FIG. 6 is a flowchart of a set of operations for operating on a data sequence using an artificial neural network configured with memoryless weight storage, according to various embodiments.

FIG. 6 is a flowchart of a set of operations 600 for operating on a data sequence using an artificial neural network configured with memoryless weight storage, according to various embodiments. The set of operations 600 may be executed by a computing unit of a neuromorphic processor, or by an artificial neuron in a recurrent layer of the ANN, as described herein. At operation 605, the computing unit may receive input data generated, or derived, from a temporal data, such as input data sequence 240 (FIG. 2). Such input data may be received from an input layer of the ANN, such as input layer 220. Such input data may also be received from one or more other computing units or artificial neurons in the recurrent layer of the ANN. Such input data, for example, may be include an activation potential on the one or more other computing units or artificial neurons.

At operation 610, the computing unit may determine a set of fixed random synaptic weights for connections between the computing unit and one or more other computing units in the ANN. In certain embodiments, the set of fixed random synaptic weights may indicate the strength of connections between the computing unit and the input layer of the ANN. The set of fixed random synaptic weights may be determined by querying a memoryless synaptic weight storage, as described herein. Such synaptic weights may indicate a factor or value (e.g., a synaptic weight) for linearly weighting, or scaling, inputs received from the one or more computing units.

At operation 615, the computing unit may operate on the input data received in operation 605 using the determined set of fixed random weights, such as to determine an updated state of the computing unit. Operating on the input data may include weighting or scaling input data received through a specific connection by a fixed random weight associated with the specific connection. Operating on the input data may also include calculating a sum of all such weighted input data. Operating on the input data may additionally include determining an updated state (e.g., an activation potential) using a non-linear function or other transformation of the calculated sum.

At operation 620, the computing unit may transmit the updated state to one or more other computing units in the ANN. Such transmitting may include broadcasting the updated state to each computing unit the ANN over a shared communication channel. Such transmitting may also include transmitting the updated state to a global arbiter, or control circuit, as described herein. Such transmitting may further include transmitting, or broadcasting, an identifier or address of the computing unit with the updated state.

FIG. 7 is a block diagram illustrating an example machine upon which any one or more of the techniques (e.g., methodologies) discussed herein may perform, according to various embodiments. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, gyrometer, magnetometer, or other sensor. The computing system may further include a neuromorphic processor 728, or other hardware accelerator, as described herein. The neuromorphic processor 728 may be an example of the neuromorphic processors discussed in FIGS. 1-5.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet., mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The figures below detail architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Instruction Formats

Embodiments of the instruction(s) described herein may be embodied in different formats. Additionally, systems, architectures, and pipelines are detailed below. Embodiments of the instructions) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8B:
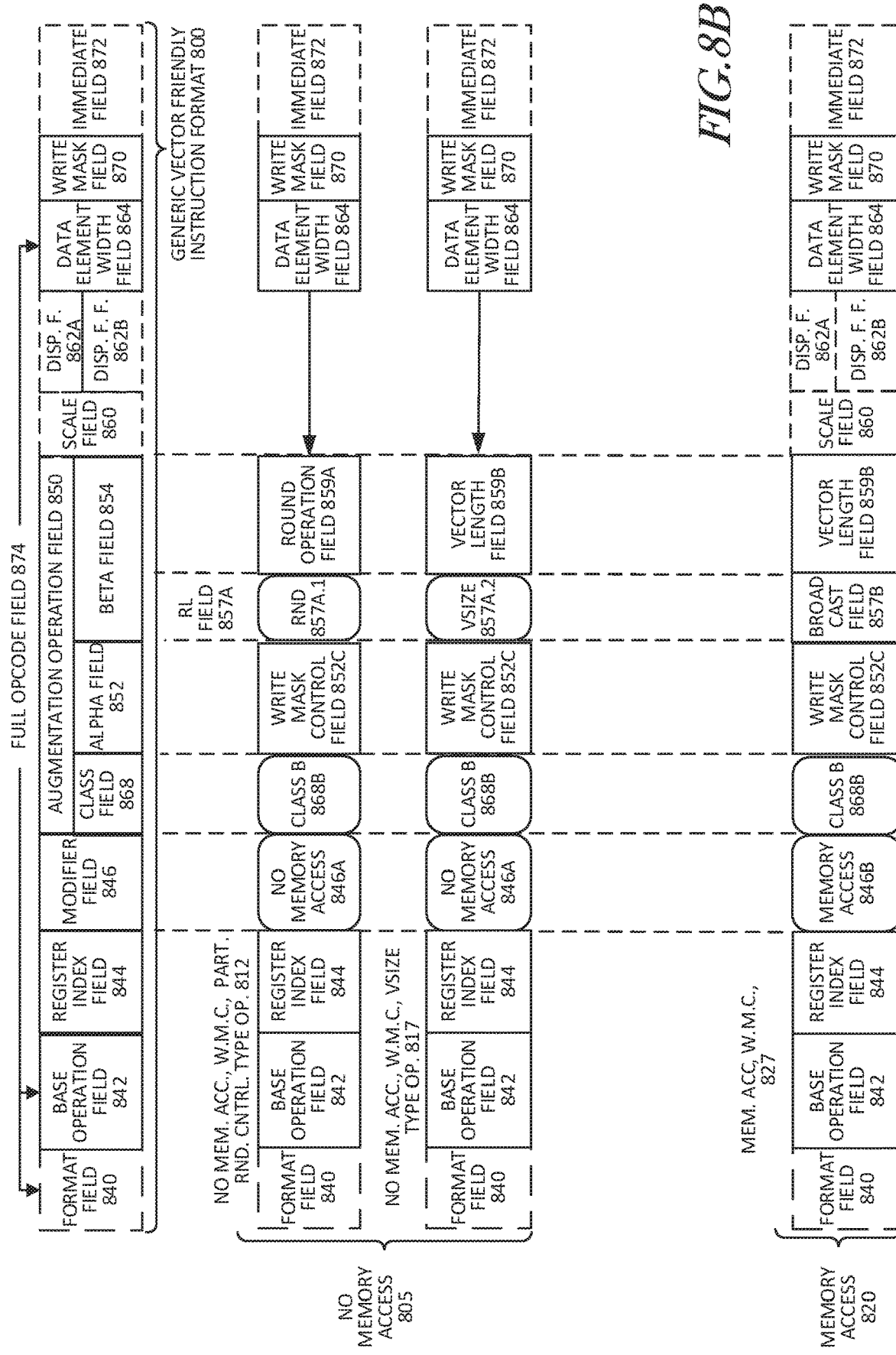

FIGS. 8A-8B are block diagrams illustrating a generic vector friendly instruction format and instruction templates thereof according to an embodiment. FIG. 8A is a block diagram illustrating a generic vector friendly instruction format and class A instruction templates thereof according to an embodiment; while FIG. 8B is a block diagram illustrating the generic vector friendly instruction format and class B instruction templates thereof according to an embodiment. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a PxQ (e.g., 32×512, 16×128, 32×1024, 64×1024) register file. While in an embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in an embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In an embodiment, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses 2scale*index+base).

Displacement Field 862A—its content is used as part of memory address generation (e.g., for address generation that uses 2scale*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 8540. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in another embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in an embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-8B, the contents of this field select between class A and class B instructions. In FIGS. 8A-8B, rounded corner squares are used to indicate a specific value is present in a field (e.g., class A 868A and class B 868B for the class field 868 respectively in FIGS. 8A-8B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In an embodiment where a processor includes a control register for specifying rounding .modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction—Templates Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In an embodiment where a processor includes a control register for specifying rounding modes, the round operation control field's 850 content overrides that register value, In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B, With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Specific Vector Friendly Instruction Format

FIG. 9 is a block diagram illustrating a specific vector friendly instruction format according to an embodiment. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although embodiments are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

Figure 9A:
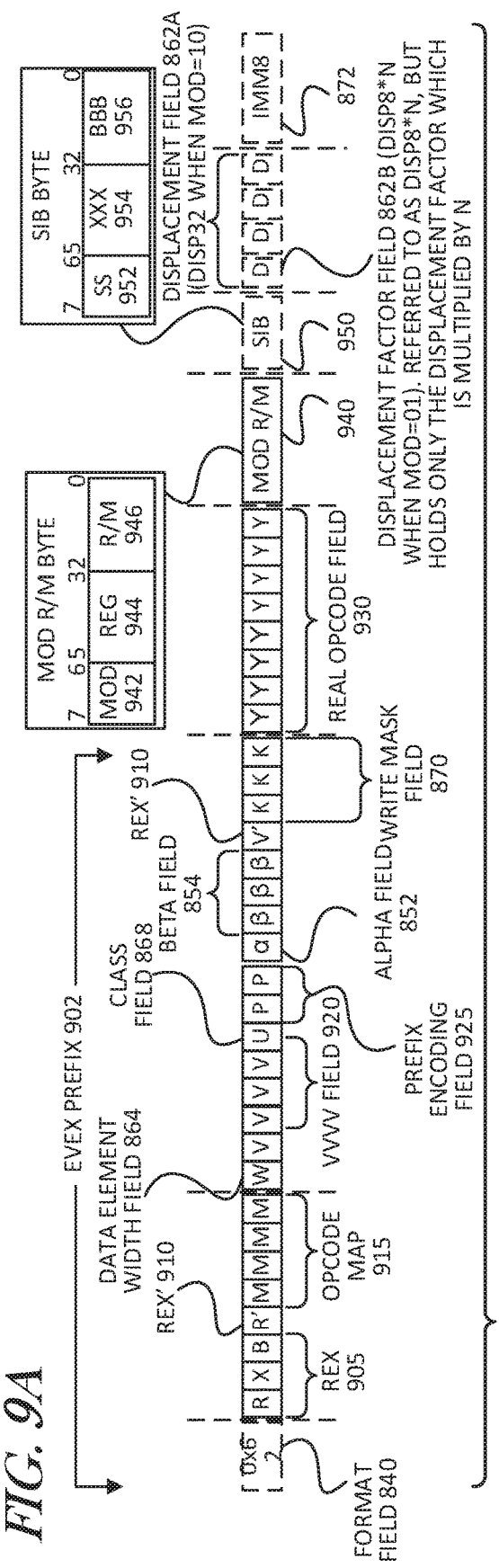
FIGS. 9A-9D are block diagrams illustrating a specific vector friendly instruction format according to an embodiment.

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0×62 (the unique value used for distinguishing the vector friendly instruction format in an embodiment).

The second-fourth bytes (EVEX Bytes 1-3) include a number of bit fields providing specific capability.

REX field 905 (EVEX Byte 1, bits [7-5])—consists of an EVEX.R bit field (EVEX Byte 1, bit [7]—EVEX.X bit field (EVEX byte 1, bit [6]—X), and 857BEX byte 1, bit [5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810 this is the first part of the REX' field 810 and is the EVEX.R' bit field (EVEX Byte 1, bit [4]—R') that is used to encode either the upper 16 or lower 16 of the extended 32 register set. In an errribodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmn)—its content encodes an implied leading opcode byte (0F, 0F 38, or 0F 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]-U)—If EVEX.U=0, it indicates class A or EVEX.U0; if EVEX.U=1, it indicates class B or EVEX.U1.

Prefix encoding field 925 (EVEX byte 2, bits [1:0]-pp) provides additional bits for the base operation field. In addition to providing support for the legacy SSE instructions in the EVEX prefix format, this also has the benefit of compacting the SIMD prefix (rather than requiring a byte to express the SIMI) prefix, the EVEX prefix requires only 2 bits). In an embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion, Alpha field 852 (EVEX byte 3, bit [7]—EH; also known as EVEX.EH, EVEX.rs, EVEX,RL, EVEX.write mask control, and EVEX,N; also illustrated with α)—as previously described, this field is context specific.

Beta field 854 (EVEX byte 3, bits [6:4]-SSS, also known as EVEX.s2-0, EVEX.r2-0, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]-kkk)—its content specifies the index of a register in the write mask registers as previously described. In an embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and RIM field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOI field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order hits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

Figure 9B:
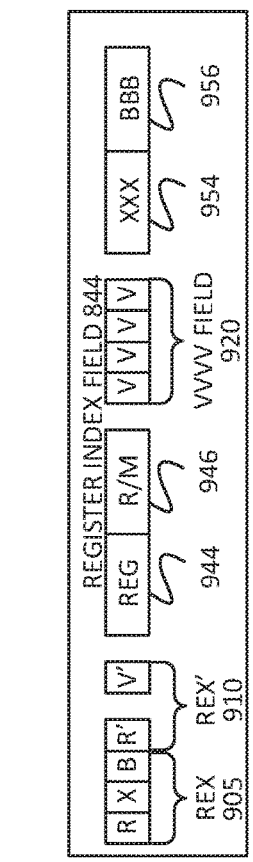

FIG. 9B is a block diagram illustrating the fields of the specific vector friendly instruction format 900 that make up the full opcode field 874 according to an embodiment. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

Figure 9C:
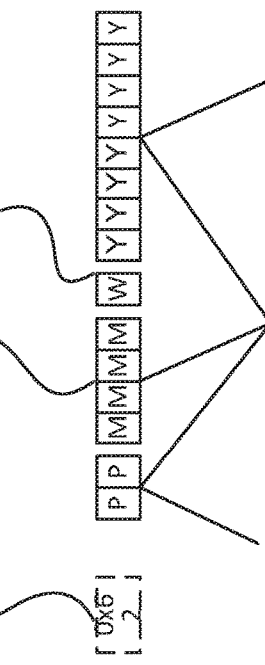

FIG. 9C is a block diagram illustrating the fields of the specific vector friendly instruction format 900 that make up the register index field 844 according to an embodiment. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
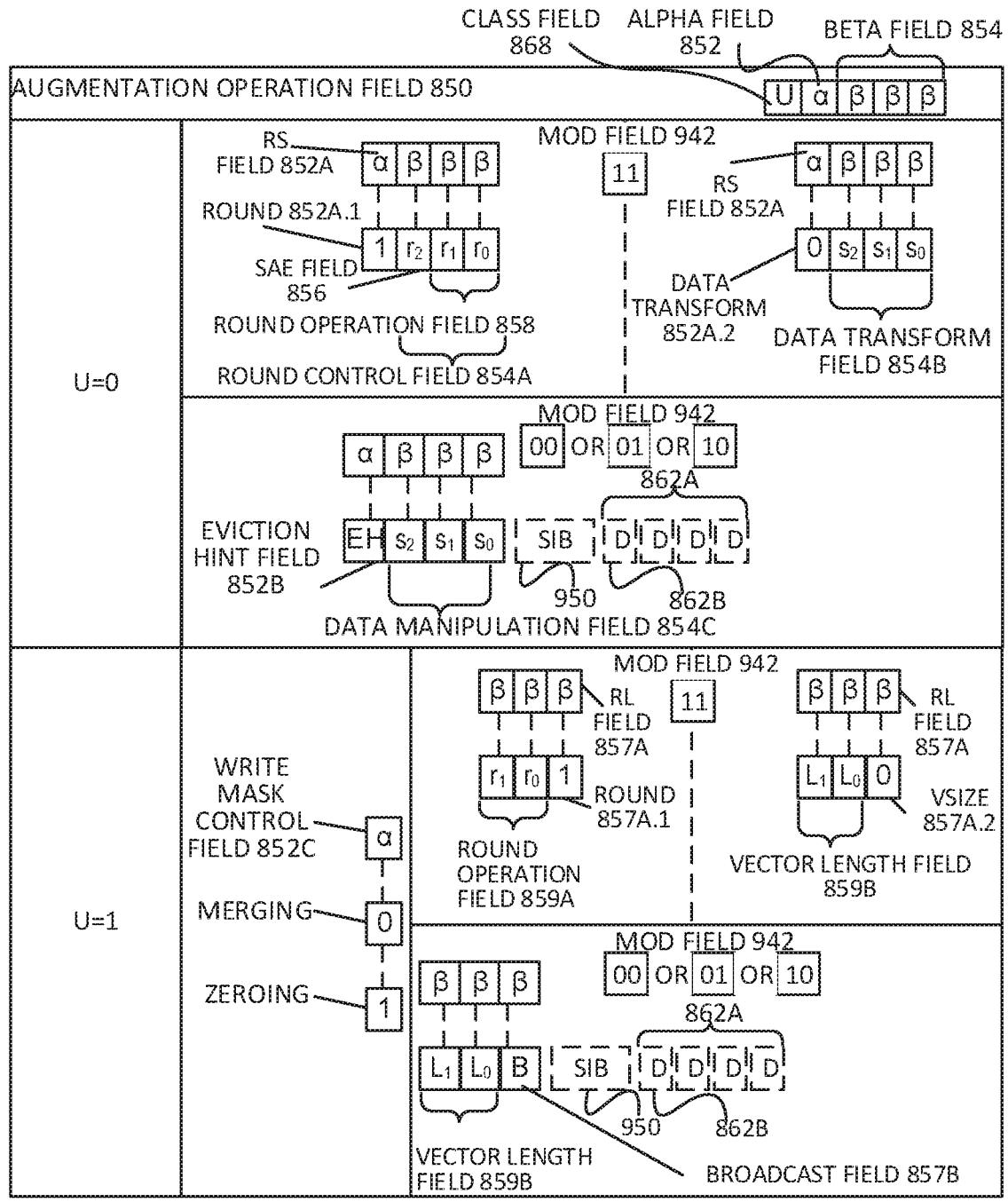

FIG. 9D is a block diagram illustrating the fields of the specific vector friendly instruction format 900 that make up the augmentation operation field 850 according to an embodiment. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 8520. When U=1 and the MOD field 942 contains 11 (signifying a no memory access operation), part of the beta field 854 (EVEX byte 3, bit [4]—S0) is interpreted as the RL field 857A; when it contains a 1 (round 857A.1) the rest of the beta field 854 (EVEX byte 3, bit [6-5]—S2-1) is interpreted as the round operation field 859A, while when the RL field 857A contains a 0 (VSIZE 857.A2) the rest of the beta field 854 (EVEX byte 3, bit [6-5]—S2-1) is interpreted as the vector length field 859B (EVEX byte 3, bit [6-5]—L1-0). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—L1-0) and the broadcast field 857B (EVEX byte 3, bit [4]—B).

Register Architecture

Figure 10:
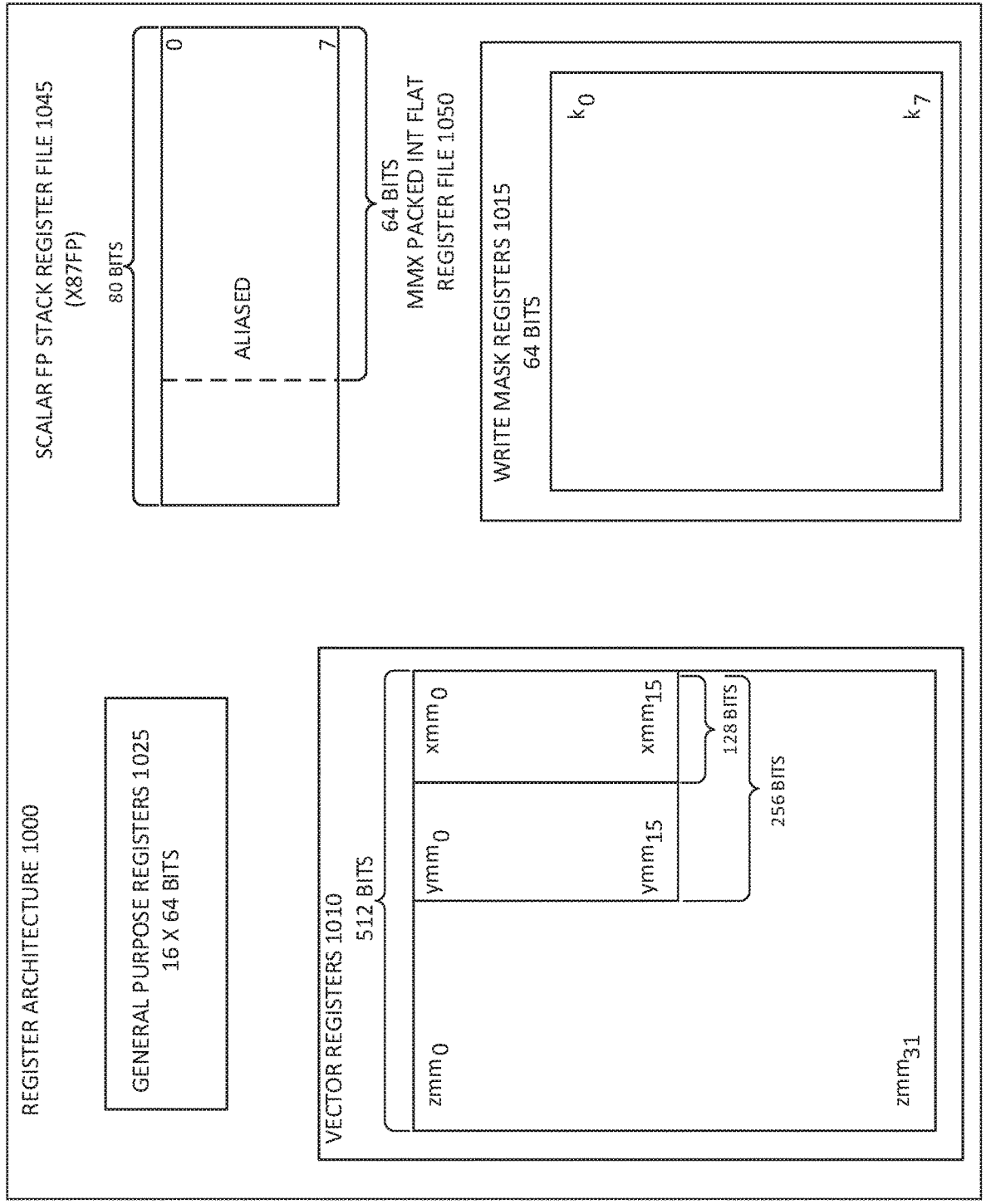
FIG. 10 is a block diagram of a register architecture according to an embodiment.

FIG. 10 is a block diagram of a register architecture 1000 according to an embodiment. In the embodiment illustrated, there are 32 vector registers 1010 that are 512 bits wide; these registers are referenced as zmm0 through zmm.31. The lower order 256 bits of the lower 16 zmm registers are overlaid on registers ymm0-16. The lower order 128 bits of the lower 16 zmm registers (the lower order 128 bits of the ymm registers) are overlaid on registers xmmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) |

In other words, the vector length field 859B selects between a maximum length and one or more other shorter lengths, where each such shorter length is half the length of the preceding length; and instructions templates without the vector length field 859B operate on the maximum vector length. Further, in an embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either leftthe same as they were prior to the instruction or zeroed depending on the embodiment.

Write mask registers 1015—in the embodiment illustrated, there are 8 write mask registers (k0 through k7), each 64 bits in size. In an alternate errtbodiment, the write mask registers 1015 are 16 bits in size. As previously described, in an embodiment, the vector mask register k0 cannot be used as a write mask; when the encoding that would normally indicate k0 is used for a write mask, it selects a hardwired write mask of 0xFEFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBI), RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Core architectures are described next, followed by descriptions of processors and computer architectures.

Core Architectures

In-order and out-of-order core block diagram

FIG. 11A is a block diagram illustrating both an in-order pipeline and a register renaming, out-of-order issue/execution pipeline according to embodiments. FIG. 11B is a block diagram illustrating both an embodiment of an in-order architecture core and a register renaming, out-of-order issue/execution architecture core to be included in a processor according to an embodiment. The solid lined boxes in FIGS. 11A-11B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In an embodiment, the core 1190 includes a microcode ROM or other medium that stores microcode for certain macroinstructions (e.g., in decode unit 1140 or otherwise within the front end unit 1130). The decode unit 1140 is coupled to a rename/a locator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In an embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In an embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or inure other levels of cache and eventually to a main memory.

By way of example, the register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In an embodiment, the core 1190 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific In-Order Core Architecture

Figure 12B:
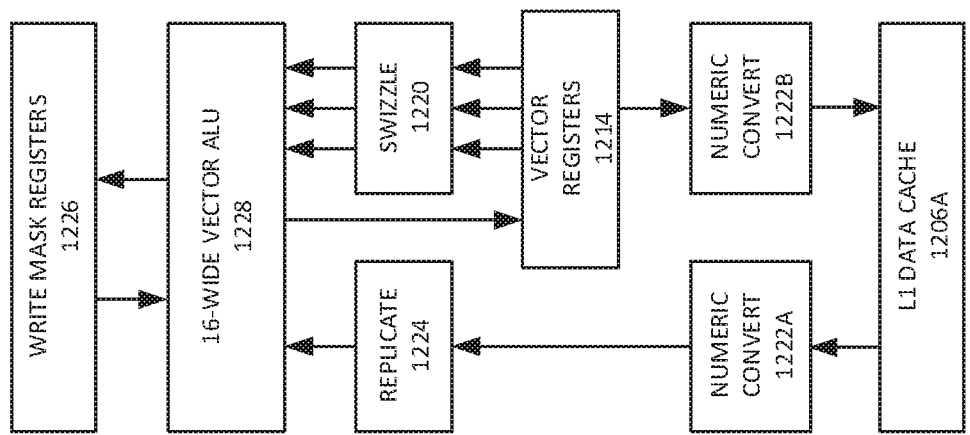
FIGS. 12A-12B illustrate block diagrams of a more specific in-order core architecture, which core would be one of several logic blocks (including other cores of the same type and/or different types) in a chip, according to an embodiment.
Figure 12A:
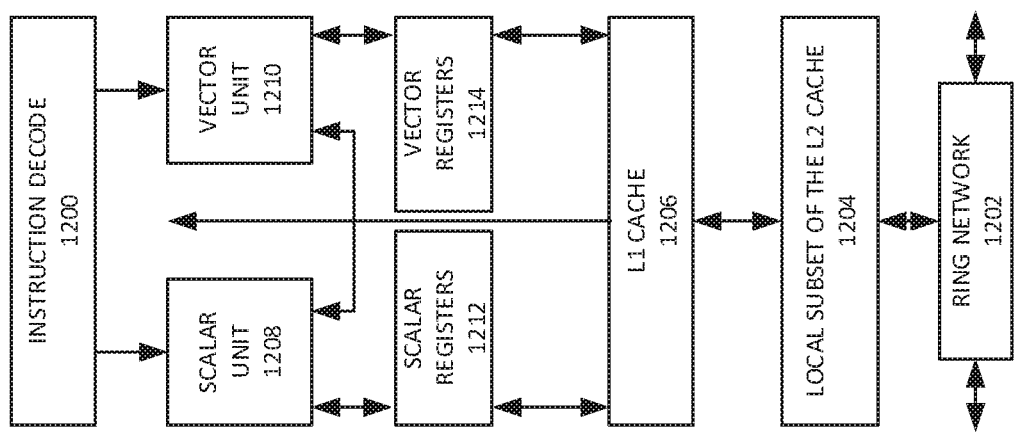

FIGS. 12A-12B illustrate a block diagram of a more specific in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to an embodiment. In an embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to an embodiment. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
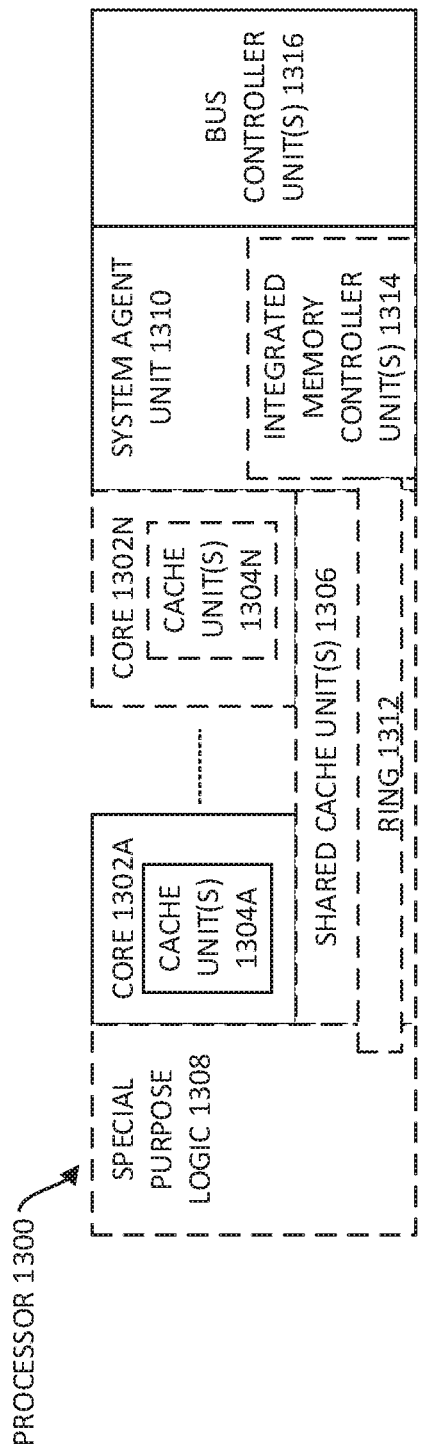
FIG. 13 is a block diagram of a processor that may have more than one core, may have an integrated memory controller, and may have integrated graphics according to an embodiment.
Figure 14:
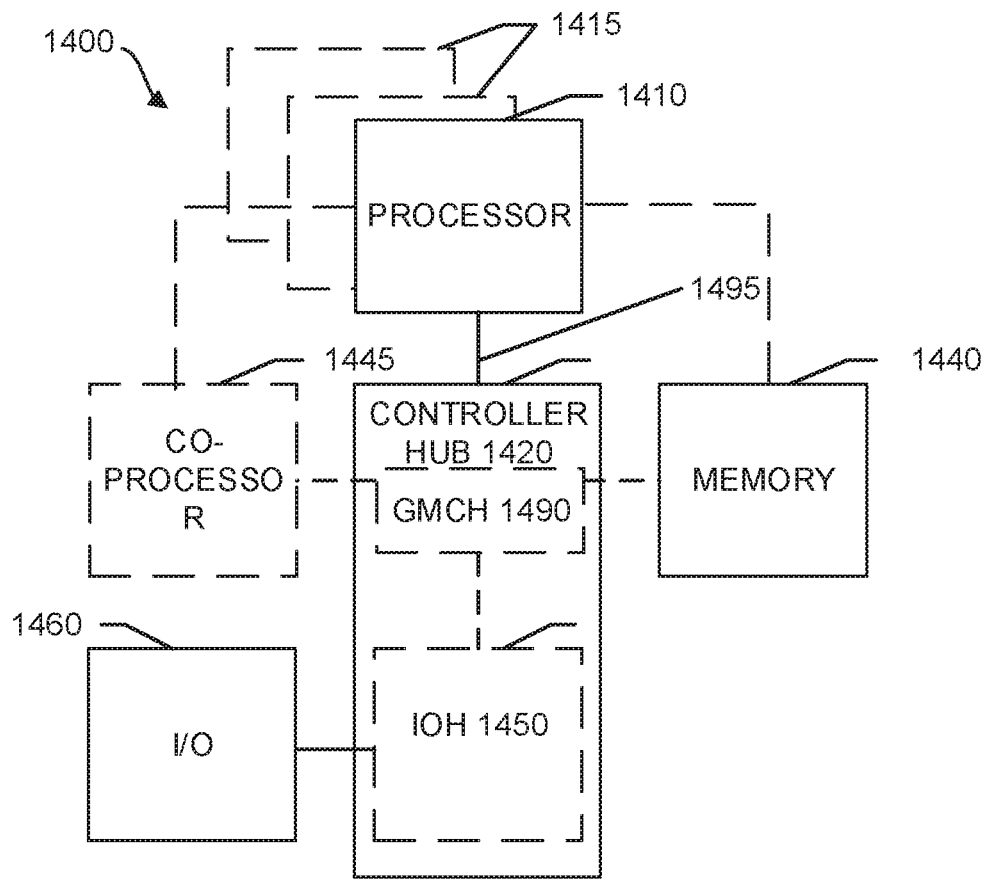
FIGS. 14-17 are block diagrams of computer architectures, according to an embodiment.

FIG. 13 is a block diagram of a processor 1300 that may have more than one core, may have an integrated memory controller, and may have integrated graphics according to embodiments. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In an embodiment, coherency is maintained between one or more cache units 1304A-N and cores 1302A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N max be capable of execution the same instruction set, while others may be capable of executing only a subset of that instruction set or a different instruction set.

Computer Architectures

FIGS. 14-17 are block diagrams of computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Referring now to FIG. 14, shown is a block diagram of a system 1400 according to an embodiment. The system 1400 may include one or more processors 1410, 1415, which are coupled to a controller hub 1420. In an erribodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In an embodiment, the coprocessor 1445 is a special-purpose processor, such as, for example, a high-throughput MIC processor, a network or communication processor, compression engine, graphics processor, GPGPU, embedded processor, or the like. In an embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In an embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
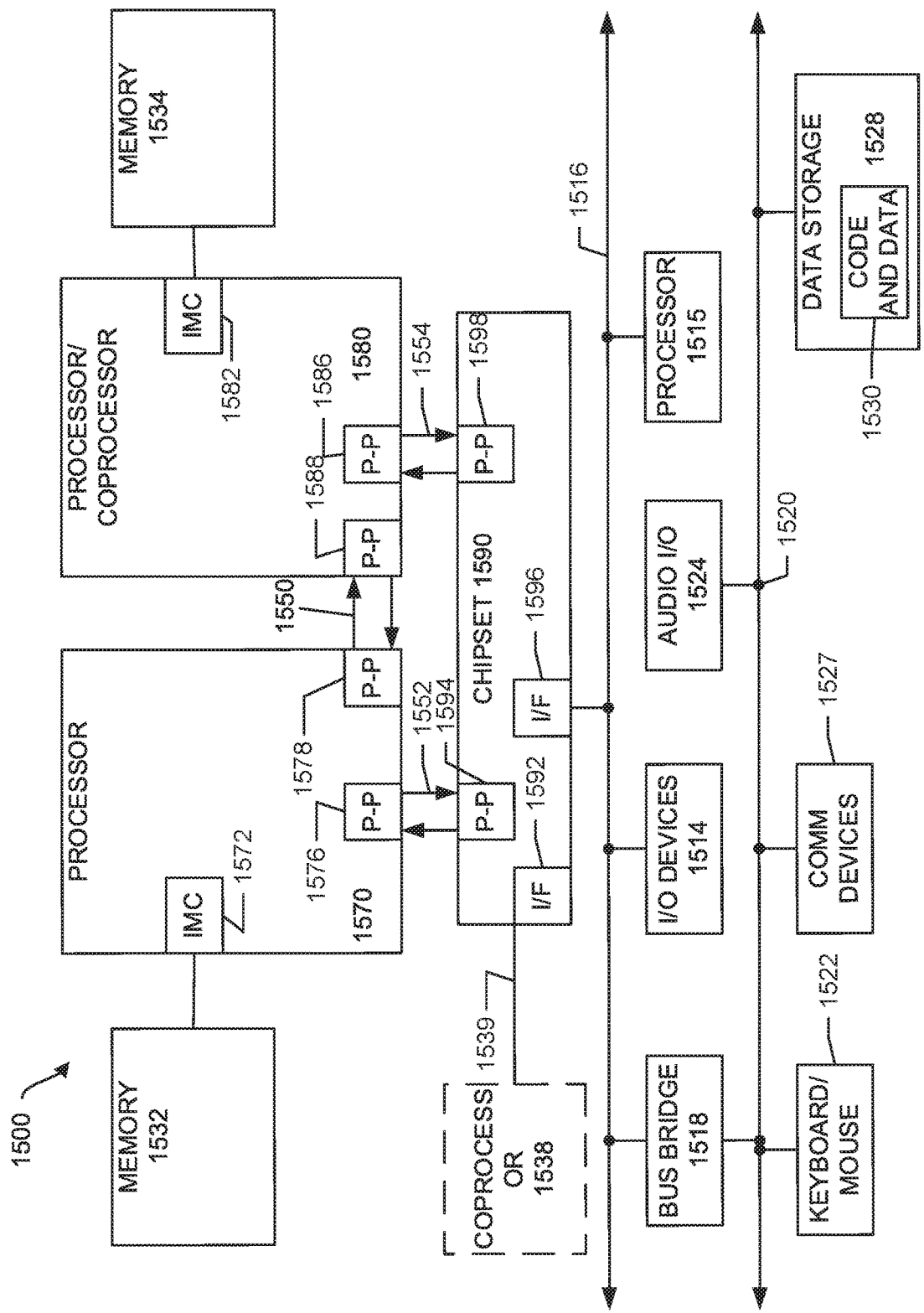

Referring now to FIG. 15, shown is a block diagram of a first more specific system 1500 in accordance with an embodiment. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In an embodiment, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In an embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In an embodiment, first bus 1516 may be a Peripheral Component Interconnect (PCI) bus, or a bus such as a POI. Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In an embodiment, one or more additional processor(s) 1515, such as coprocessors, high-throughput MX processors, GPGPU's, accelerators (such as, e.g., graphics accelerators or digital signal processing (DSP) units), field programmable gate arrays, or any other processor, are coupled to first bus 1516. In an embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in an embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
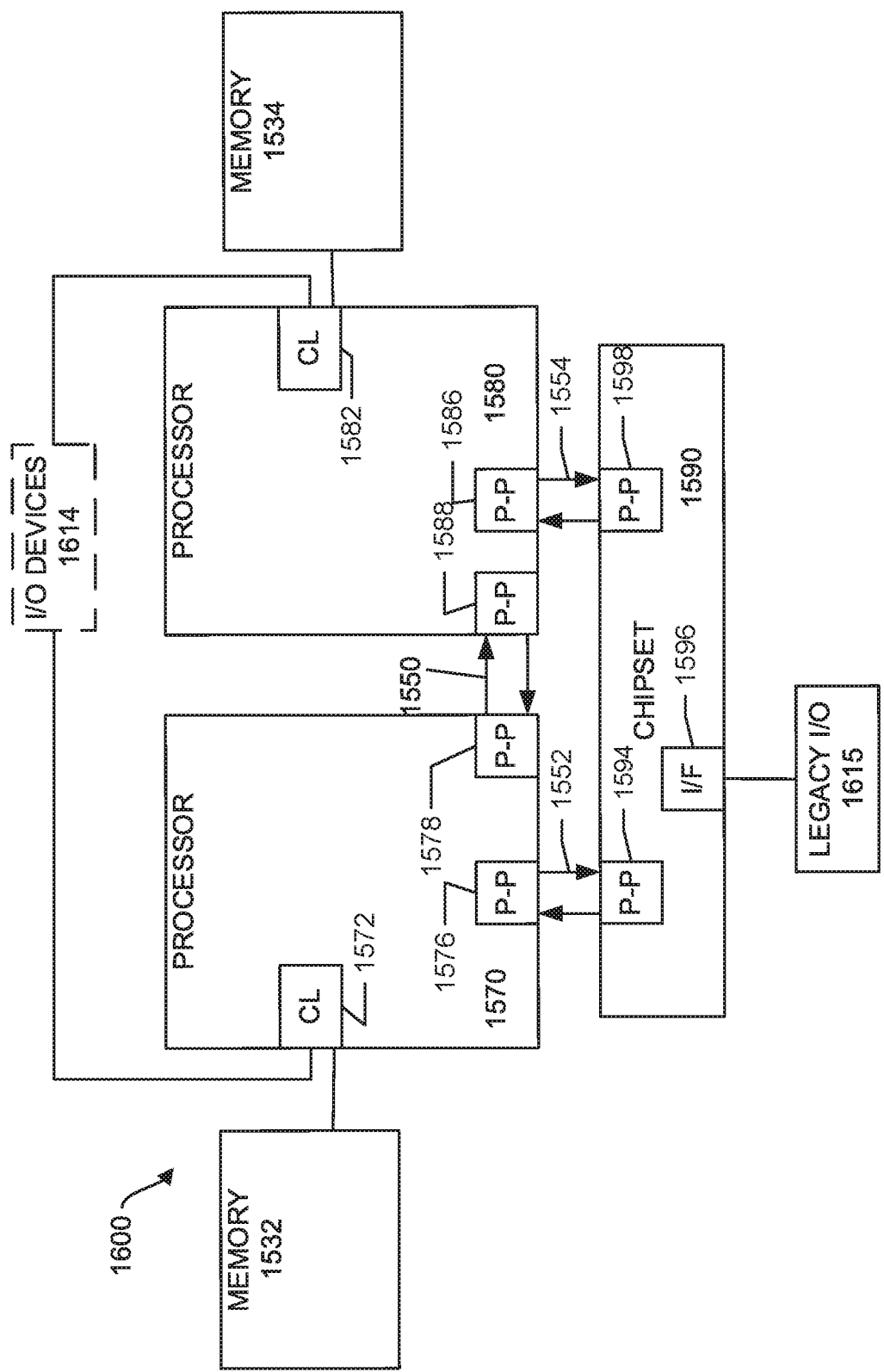

Referring now to FIG. 16, shown is a block diagram of a second more specific system 1600 in accordance with an embodiment. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that 110 devices 1614 are also coupled to the control logic 1572, 1582. Legacy I/O devices 1615 are coupled to the chipset 1590.

Figure 17:
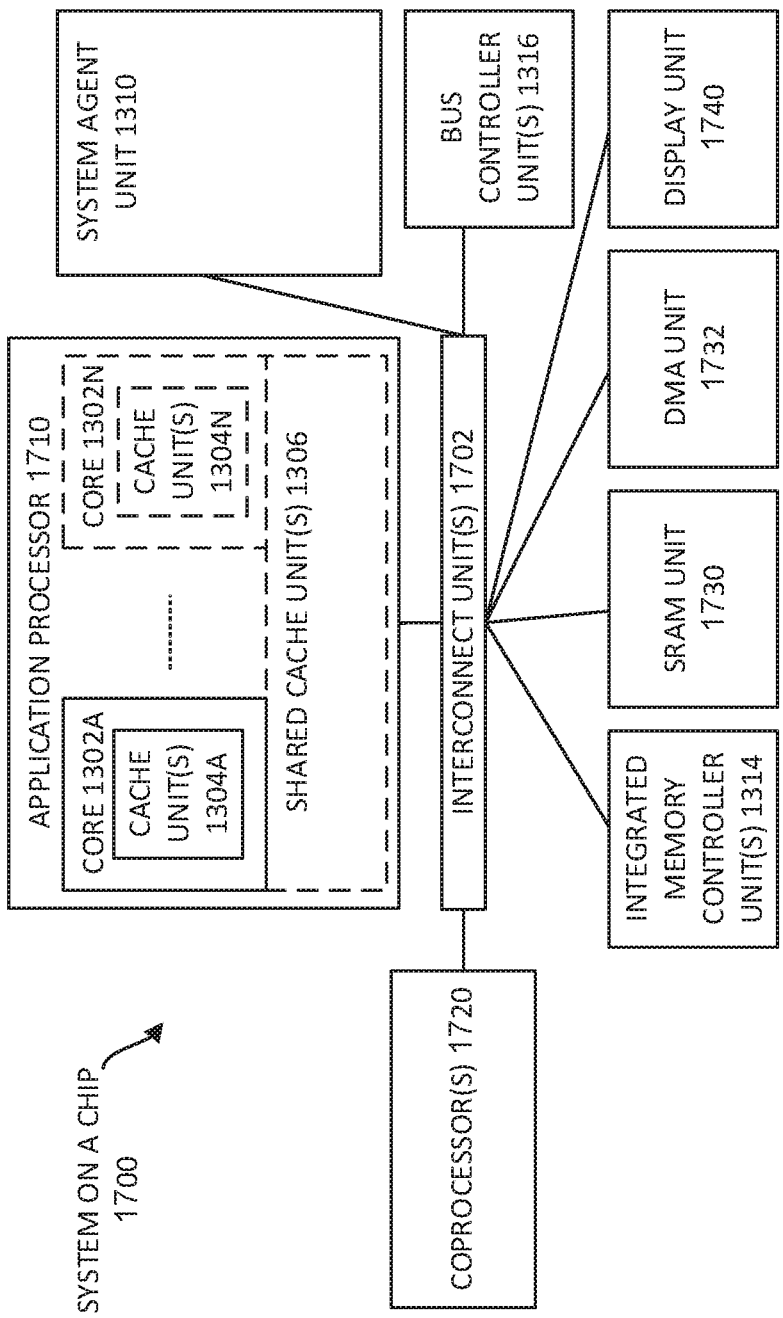

Referring now to FIG. 17, shown is a block diagram of a SoC 1700 in accordance with an embodiment. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N with integrated cache units 1304A-N and shared cache unit(s) 1306; a system agent unit 1310; a bus controller unit(s) 1316; an integrated memory controller units) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external. displays. In an embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
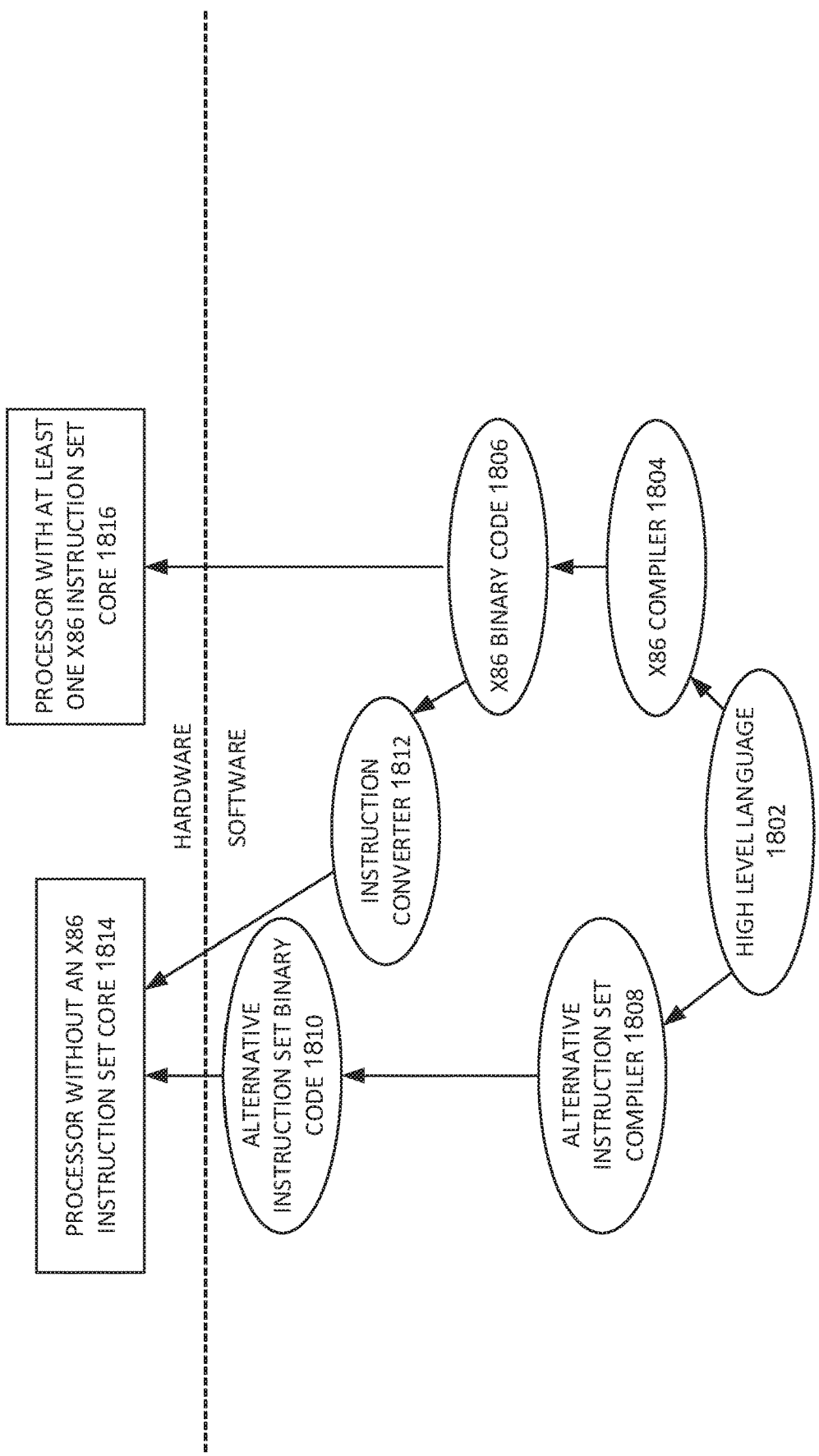
FIG. 18 is a block diagram contrasting the use of a software instruction converter to convert binary instructions in a source instruction set to binary instructions in a target instruction set according to an embodiment.

FIG. 18 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Additional Notes & Examples:

Example 1 is a system for operating on a data sequence, the system comprising: one or more circuits to form an input layer to receive the data sequence; one or more input hardware computing units to form a recurrent layer to transform the data sequence, the one or more input hardware computing units connected using fixed randomly selected weights, a first hardware computing unit of the one or more input hardware computing units to: receive an input from a second hardware computing unit, the input generated using a portion of the data sequence, determine, from the fixed randomly selected weights, a weight of a connection between the first hardware computing unit and the second hardware computing unit using a fixed random weight generator and an identifier of the second hardware computing unit, and operate on the input using the weight to determine a state of the first hardware computing unit; and one or more output hardware computing units to form an output layer to operate on states of the one or more input computing units to generate an output based on a property of the data sequence.

In Example 2, the subject matter of Example 1 includes, wherein the fixed random weight generator is to generate one or more deterministic fix random weights.

In Example 3, the subject matter of Examples 1-2 includes, wherein the fixed random weight generator is a pseudorandom number generator.

In Example 4, the subject matter of Example 3 includes, wherein pseudorandom number generator is a linear feedback shift register.

In Example 5, the subject matter of Examples 3-4 includes, wherein the first hardware computing unit is to provide identifiers of one or more of the input hardware computing units connected to the first hardware computing unit to the pseudorandom number generator in a sequential order.

In Example 6, the subject matter of Examples 1-5 includes, wherein the fixed random weight generator is a hash function.

In Example 7, the subject matter of Examples 1-6 includes, wherein the weight of the connection between the first and second hardware computing units is determined using an output of the fixed random weight generator and a scaling unit, the scaling unit configured to operate on outputs of the fixed random weight generator to generate random weights that cause the computing layer to satisfy a specified mathematical property.

In Example 8, the subject matter of Example 7 includes, wherein to operate on the outputs of the fixed random weight generator, the scaling unit is to scale and shift the outputs of the fixed random weight generator.

In Example 9, the subject matter of Examples 7-8 includes, wherein the specified mathematical property is an echo-state property.

In Example 10, the subject matter of Examples 1-9 includes, wherein the identifier of the second hardware computing unit corresponds to a position of the second hardware computing unit in a sequence of the one or more hardware computing units connected to the first hardware computing unit.

In Example 11, the subject matter of Examples 1-10 includes, wherein the fixed random weight generator is a component of a memory associated with the one or more input hardware computing units.

In Example 12, the subject matter of Examples 1-11 includes, wherein weights connecting the recurrent layer to the output layer are adjustable.

In Example 13, the subject matter of Examples 1-12 includes, wherein the one or more input hardware computing units are artificial neurons.

Example 14 is a method of operating on a data sequence, the method comprising: receiving, at a first hardware computing unit, an input from a second hardware computing unit, the input generated using a portion of the data sequence, determining, from a one or more fixed randomly selected weights, a weight associated with a connection between the first hardware computing unit and the second hardware computing unit using a fixed random weight generator and an identifier of the second hardware computing unit; operating on the input using the weight to determine a state of the first hardware computing unit; and generating, using the state of the first hardware computing unit, an output based on a property of the data sequence.

In Example 15, the subject matter of Example 14 includes, wherein the fixed random weight generator generates a deterministic one or more fix random weights.

In Example 16, the subject matter of Examples 14-15 includes, wherein the fixed random weight generator is a pseudorandom number generator.

In Example 17, the subject matter of Example 16 includes, wherein the pseudorandom number generator is a linear feedback shift register.

In Example 18, the subject matter of Examples 14-17 includes, wherein the fixed random weight generator is a hash function.

In Example 19, the subject matter of Examples 14-18 includes, operating on outputs of the fixed random weight generator to generate random weights that satisfy an echo-state property of a recurrent artificial neural network.

In Example 20, the subject matter of Example 19 includes, wherein operating on the outputs of the fixed random weight generator comprises scaling and shifting the outputs of the fixed random weight generator.

Example 21 is a system of operating on a data sequence, the system comprising: means for receiving, at a first hardware computing unit, an input from a second hardware computing unit, the input generated using a portion of the data sequence, means for determining, from a one or more fixed randomly selected weights, a weight associated with a connection between the first hardware computing unit and the second hardware computing unit using a fixed random weight generator and an identifier of the second hardware computing unit; means for operating on the input using the weight to determine a state of the first hardware computing unit; and means for generating, using the state of the first hardware computing unit, an output based on a property of the data sequence.

In Example 22, the subject matter of Example 21 includes, wherein the fixed random weight generator generates a deterministic one or more fix random weights.

In Example 23, the subject matter of Examples 21-22 includes, wherein the fixed random weight generator is a pseudorandom number generator.

In Example 24, the subject matter of Example 23 includes, wherein the pseudorandom number generator is a linear feedback shift register.

In Example 25, the subject matter of Examples 21-24 includes, wherein the fixed random weight generator is a hash function.

In Example 26, the subject matter of Examples 21-25 includes, means for operating on outputs of the fixed random weight generator to generate random weights that satisfy an echo-state property of a recurrent artificial neural network.

In Example 27, the subject matter of Example 26 includes, wherein the means for operating on the outputs of the fixed random weight generator comprise means for scaling and shifting the outputs of the fixed random weight generator.

Example 28 is at least one machine readable medium including instructions for operating on a data sequence, the instructions, when executed by processing circuitry, cause the processing circuitry to perform operations comprising: receiving, at a first hardware computing unit, an input from a second hardware computing unit, the input generated using a portion of the data sequence, determining, from a one or more fixed randomly selected weights, a weight associated with a connection between the first hardware computing unit and the second hardware computing unit using a fixed random weight generator and an identifier of the second hardware computing unit; operating on the input using the weight to determine a state of the first hardware computing unit; and generating, using the state of the first hardware computing unit, an output based on a property of the data sequence.

In Example 29, the subject matter of Example 28 includes, wherein the fixed random weight generator generates a deterministic one or more fix random weights.

In Example 30, the subject matter of Examples 28-29 includes, wherein the fixed random weight generator is a pseudorandom number generator.

In Example 31, the subject matter of Example 30 includes, wherein the pseudorandom number generator is a linear feedback shift register.

In Example 32, the subject matter of Examples 28-31 includes, wherein the fixed random weight generator is a hash function.

In Example 33, the subject matter of Examples 28-32 includes, wherein the operations further comprise: operating on outputs of the fixed random weight generator to generate random weights that satisfy an echo-state property of a recurrent artificial neural network.

In Example 34, the subject matter of Example 33 includes, wherein operating on the outputs of the fixed random weight generator comprises scaling and shifting the outputs of the fixed random weight generator.

Example 35 is a computing device for operating on a data sequence, the computing device comprising: a neuromorphic processor to: receive, at a first hardware computing unit, an input from a second hardware computing unit, the input generated using a portion of the data sequence, determine, from one or more fixed randomly selected weights, a weight associated with a connection between the first hardware computing unit and the second hardware computing unit using a fixed random weight generator and an identifier of the second hardware computing unit; operate on the input using the weight to determine a state of the first hardware computing unit; and generate, using the state of the first computing unit, an output based on a property of the data sequence.

In Example 36, the subject matter of Example 35 includes, wherein the fixed random weight generator generates a deterministic set of fixed random weights.

In Example 37, the subject matter of Examples 35-36 includes, wherein the fixed random weight generator is a pseudorandom number generator.

In Example 38, the subject matter of Example 37 includes, wherein the pseudorandom number generator is a linear feedback shift register, In Example 39, the subject matter of Examples 35-38 includes, wherein the fixed random weight generator is a hash function.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for operating on a data sequence, the system comprising:
   one or more circuits to form an input layer to receive the data sequence;
   one or more input hardware computing units to form a recurrent layer to transform the data sequence, the one or more input hardware computing units connected using fixed randomly selected weights, a first hardware computing unit of the one or more input hardware computing units to:
   receive an input from a second hardware computing unit, the input generated using a portion of the data sequence,
   determine, from the fixed randomly selected weights, a weight of a connection between the first hardware computing unit and the second hardware computing unit using a fixed random weight generator and an identifier of the second hardware computing unit, and
   operate on the input using the weight to determine a state of the first hardware computing unit; and
   one or more output hardware computing units to form an output layer to operate on states of the one or more input computing units to generate an output based on a property of the data sequence.

2. The system of claim 1, wherein the fixed random weight generator is to generate one or more deterministic fixed random weights.

3. The system of claim 1, wherein the fixed random weight generator is a pseudorandom number generator.

4. The system of claim 3, wherein pseudorandom number generator is a linear feedback shift register.

5. The system of claim 3, wherein the first hardware computing unit is to provide identifiers of one or more of the input hardware computing units connected to the first hardware computing unit to the pseudorandom number generator in a sequential order.

6. The system of claim 1, wherein the fixed random weight generator is a hash function.

7. The system of claim 1, wherein the weight of the connection between the first and second hardware computing units is determined using an output of the fixed random weight generator and a scaling unit, the scaling unit configured to operate on outputs of the fixed random weight generator to generate random weights that cause the computing layer to satisfy a specified mathematical property.

8. The system of claim 7, wherein to operate on the outputs of the fixed random weight generator, the scaling unit is to scale and shift the outputs of the fixed random weight generator.

9. The system of claim 7, wherein the specified mathematical property is an echo- state property.

10. The system of claim 1, wherein the identifier of the second hardware computing unit corresponds to a position of the second hardware computing unit in a sequence of the one or more hardware computing units connected to the first hardware computing unit.

11. The system of claim 1, wherein the fixed random weight generator is a component of a memory associated with the one or more input hardware computing units.

12. The system of claim 1, wherein weights connecting the recurrent layer to the output layer are adjustable.

13. The system of claim 1, wherein the one or more input hardware computing units are artificial neurons.

14. At least one non-transitory machine readable medium including instructions for operating on a data sequence, the instructions, when executed by processing circuitry, cause the processing circuitry to perform operations comprising:
   receiving, at a first hardware computing unit, an input from a second hardware computing unit, the input generated using a portion of the data sequence,
   determining, from a one or more fixed randomly selected weights, a weight associated with a connection between the first hardware computing unit and the second hardware computing unit using a fixed random weight generator and an identifier of the second hardware computing unit;
   operating on the input using the weight to determine a state of the first hardware computing unit; and
   generating, using the state of the first hardware computing unit, an output based on a property of the data sequence.

15. The at least one non-transitory machine readable medium of claim 14, wherein the fixed random weight generator generates a deterministic one or more fixed random weights.

16. The at least one non-transitory machine readable medium of claim 14, wherein the fixed random weight generator is a pseudorandom number generator.

17. The at least one non-transitory machine readable medium of claim 16, wherein the pseudorandom number generator is a linear feedback shift register.

18. The at least one non-transitory machine readable medium of claim 14, wherein the fixed random weight generator is a hash function.

19. The at least one non-transitory machine readable medium of claim 14, wherein the operations further comprise:
   operating on outputs of the fixed random weight generator to generate random weights that satisfy an echo-state property of a recurrent artificial neural network.

20. The at least one non-transitory machine readable medium of claim 19, wherein operating on the outputs of the fixed random weight generator comprises scaling and shifting the outputs of the fixed random weight generator.

21. A computing device for operating on a data sequence, the computing device comprising:
   a neuromorphic processor to:
      receive, at a first hardware computing unit, an input from a second hardware computing unit, the input generated using a portion of the data sequence,
      determine, from one or more fixed randomly selected weights, a weight associated with a connection between the first hardware computing unit and the second hardware computing unit using a fixed random weight generator and an identifier of the second hardware computing unit;
      operate on the input using the weight to determine a state of the first hardware computing unit; and
      generate, using the state of the first computing unit, an output based on a property of the data sequence.

22. The computing device of claim 21, wherein the fixed random weight generator generates a deterministic set of fixed random weights.

23. The computing device of claim 21, wherein the fixed random weight generator is a pseudorandom number generator.

24. The computing device of claim 23, wherein the pseudorandom number generator is a linear feedback shift register.

25. The computing device of claim 21, wherein the fixed random weight generator is a hash function.

* * * * *